United States Patent

Tsujihashi

[11] Patent Number: 5,903,484
[45] Date of Patent: May 11, 1999

[54] TREE CIRCUIT

[75] Inventor: Yoshiki Tsujihashi, Tokyo, Japan

[73] Assignee: Mitsubishi Denki Kabushiki Kaisha, Tokyo, Japan

[21] Appl. No.: 08/769,524

[22] Filed: Dec. 19, 1996

[30] Foreign Application Priority Data

Jul. 24, 1996 [JP] Japan ................................. 8-194920

[51] Int. Cl.⁶ .................................................. G06F 7/52
[52] U.S. Cl. ...................................................... 364/754.01
[58] Field of Search ............................. 364/754.01, 758, 364/760.02, 748.09, 759, 760.01

[56] References Cited

U.S. PATENT DOCUMENTS

| | | | |
|---|---|---|---|
| 5,181,185 | 1/1993 | Han et al. ........................... | 364/760.01 |
| 5,465,226 | 11/1995 | Goto ....................................... | 364/757 |
| 5,619,440 | 4/1997 | Komoda .............................. | 364/754.01 |

FOREIGN PATENT DOCUMENTS 4-147334   5/1992   Japan .
6-301519   10/1994  Japan .

OTHER PUBLICATIONS

"High Speed Multiply Using Four Input Carry–Save Adder," R. H. Larson, IBM Technical Disclosure Bulletin, Dec. 1973, vol. 16, No. 7.

Primary Examiner—Emmanuel L. Moise
Attorney, Agent, or Firm—Burns, Doane, Swecker & Mathis, LLP

[57] ABSTRACT

An extended 4-input 2-output addition block ($1a$) is provided, along with 4-input 2-output addition blocks ($2a$ to $2c$), in the first stage of a tree circuit. Further, 4-input 2-output addition blocks ($2d$ and $2e$) are provided in the second stage and a 4-input 2-output addition block ($2f$) is provided in the third stage. Input signals of the addition blocks in the same stage arrive at the same time and the number of logical stages in a critical path of the tree circuit is reduced. Thus, parallel operation of the circuit is improved, to thereby ensure higher-speed operation of a multiplier.

13 Claims, 34 Drawing Sheets

HIGH ←——————→ LOW

TREE CIRCUIT

BACKGROUND OF THE INVENTION

1. Field of the Invention

The present invention relates to a binary digital arithmetic unit, and more particularly to a tree circuit used in a parallel multiplier circuit for multiplication of multiplicand and multiplier of signed numbers in the two's complement representation to obtain a product of signed number in the two's complement representation.

2. Description of the Background Art

In general, recent microprocessors and DSPs (Digital Signal Processors) are equipped with a parallel multiplier for fast execution of multiplication instructions. The parallel multiplier circuit generates a plurality of partial products from multiplier and multiplicand as input operands for multiplication and adds up these partial products to obtain a multiplication result, i.e., a product. Accordingly, approaches to attain the following two objects are proposed as a technique of speeding up the operation of the parallel multiplier circuit.

The first object is to reduce the number of partial products to be generated. To attain this object, the Booth algorithm, especially the secondary Booth algorithm, is typically used. The second object is to perform fast addition of a plurality of the partial products. To attain this object, a circuit system to achieve a parallel operation of fast adder circuits is required.

A background-art fast multiplier circuit will be discussed, taking a circuit for performing multiplication of a 32-bit signed multiplicand X in the two's complement representation by a 32-bit signed multiplier Y in the two's complement representation to obtain a 64-bit signed product Z in the two's complement representation (the circuit is abbreviatedly referred to as "32×32 multiplier" hereinafter) as an example.

By generation of a partial product for each bit of the multiplier Y, thirty-two partial products are generated, and further these partial products need to be added up. However, accordingly the secondary Booth algorithm, a set of adjacent three bits of the multiplier Y is dealt with as a unit to reduce the number of partial products. Thus, the first object is attained.

Specifically, assuming that $y_i$ (i=0 to 31) is 0 or 1, the multiplier Y is expressed using 32-bit signed number in the two's complement representation as, $$Y = -y_{31} \cdot 2^{31} + \sum_{i=0}^{30} y_i \cdot 2^i \quad (1)$$

Then, the product Z is expressed as $$Z = X \cdot Y = \sum_{j=0}^{15} X \cdot (-2y_{2j+1} + y_{2j} + y_{2j-1}) 2^{2j} = \sum_{j=0}^{15} P_j \quad (2)$$

(where $Y_{-1} \equiv 0$)

Thus, to obtain the product Z, it is only needed to add up sixteen partial products $P_j$ (j=0 to 15).

Table 1 shows a truth table of the secondary Booth algorithm.

TABLE 1

| $y_{2j+1}$ | $y_{2j}$ | $y_{2j-1}$ | $P_j$ | $pp_j$ | $pc_j$ |
|---|---|---|---|---|---|
| 0 | 0 | 0 | 0 | 0 | 0 |
| 0 | 0 | 1 | $+X \cdot 2^j$ | X | 0 |
| 0 | 1 | 0 | $+X \cdot 2^j$ | X | 0 |
| 0 | 1 | 1 | $+X \cdot 2^{j+1}$ | 2X | 0 |
| 1 | 0 | 0 | $-X \cdot 2^{j+1}$ | $\sim$2X | 1 |
| 1 | 0 | 1 | $-X \cdot 2^j$ | $\sim$X | 1 |
| 1 | 1 | 0 | $-X \cdot 2^j$ | $\sim$X | 1 |
| 1 | 1 | 1 | 0 | 0 | 0 |

In table 1, "$\sim$" denotes logical inversion, and there are eight combinations of possible values of adjacent three bits of the multiplier Y. Accordingly, the partial product $P_j$ takes one of 0, $+X \cdot 2^j$, $+X \cdot 2^{j+1}$, $-X \cdot 2^j$, $-X \cdot 2^{j+1}$. In binary digital arithmetic operation using the two's complement representation system, "multiplication of data by two" is achieved by shifting the whole data upwardly by one bit and "sign-inversion" is achieved by inverting all the bits of the data (by which the value of the first element $pp_j$ of the partial product is inverted) and adding 1 to the least significant bit (by which the second element $pc_j$ of the partial product takes "1"). Then, the partial product $P_j$ is expressed as $$P_j = (pp_j + pc_j) \cdot 2^{2j} \quad (3)$$

Accordingly, to add up the sixteen partial products $P_0$ to $P_{15}$ generated according to the secondary Booth algorithm, it is needed to add the first element $pp_j$ having thirty-three bits of the partial product of which the least significant bit is the 2j-th bit when j=0 to 15 (specifically, the bit positions range from 2j to 2j+32, and the position higher than the thirty-second bit position by one bit is needed because of a possibility of multiplying 32-bit data by 2) and the second element $pc_j$ having one bit of the partial product on the 2j-th bit (in other words, $2^{2j}$ represents the scale of the first and second elements).

To attain the second object, specifically, to perform fast addition of partial products, a carry-save technique, a Wallace-Tree technique and the like are typically used as the circuit system to achieve the parallel operation of the fast adder circuits. Using any one of the techniques, a plurality of (sixteen here) intermediated sums are added in the form of a tournament while being compressed, to ultimately provide two intermediated sums (the sums are referred to as "eventual intermediate sums" hereinafter). Carry signals generated during the process to obtain the eventual intermediate sums are postponed to the subsequent-stage addition. Propagations of the carry signals to higher-order bits are parallelly performed and a critical path (path for controlling the rate of circuit operation) is shortened on the whole, to ensure fast addition.

Final addition of the two eventual intermediate sums provides a product of the multiplicand and the multiplier. The final addition is performed for the two sums each consisting of a plurality of bits at high speed by using e.g., carry-lookahead system. The final addition will not be discussed since it is well-known technique.

The technique, to attain the second object, of adding a plurality of partial products in the form of a tournament while sequentially compressing to eventually generate the two eventual intermediate sums will be examined in detail and then present a problem of the background art.

FIG. 13 is a block diagram of the background art to implement the wallace-Tree technique. In this figure, 4-input 2-output addition blocks 22a to 22g are interconnected in a tree structure. Further, a 3-input 2-output addition block 24a is provided to receive an output of the 4-input 2-output addition block 22g.

FIGS. 14A to 14C are block diagrams cooperatively showing the detail of FIG. 13. FIG. 14 is a schematic diagram showing the connection between FIGS. 14A to 14C. FIG. 14A is continuous with FIG. 14B at a virtual line Q19—Q19 and FIG. 14B is continuous with FIG. 14C at a virtual line Q20—Q20. The width of each addition block corresponds to the bit width thereof and the position in a horizontal direction corresponds to the bit position.

FIGS. 15A to 15C are block diagrams cooperatively illustrating a configuration of the 4-input and 2-output addition block 22a. FIG. 15A is continuous with FIG. 15B at a virtual line Q22—Q22 and FIG. 15B is continuous with FIG. 15C at a virtual line Q23—Q23. The 4-input 2-output addition block 22a consists of thirty-five 4-input 2-output adders 200 each for one bit which are connected in series. A carry-out Co of the 4-input 2-output adder 200 on each bit position becomes a carry-in Ci of the 4-input 2-output adder 200 on the higher-next bit position. If the carry-out Co is not dependent on the carry-in Ci in a 4-input 2-output adder for one bit, the carry-out Co is not propagated across the next bit within the 4-input 2-output addition block consisting of the 4-input 2-output adders connected in series.

In the background-art addition of partial products shown in FIGS. 14A to 14C, the 3-input 2-output addition block 24a in the fourth stage is needed only for adding the second element $pc_{15}$ having one bit of the partial product to the lower output $so_{27}$ and the upper output $co_{27}$ of the 4-input 2-output addition block 22g. The second element $pc_{15}$ of the partial product is an obstacle to the speeding-up of the multiplier and the 3-input 2-output addition block 24a is an obstacle to high integration of the circuit.

Specifically, the speed of the multiplier is estimated as follows. The 3-input 2-output addition block 24a consists of 3-input 2-output adders 400 each for one bit connected in series, and one of them is shown in a circuit diagram of FIG. 16. The truth table of the 3-input 2-output adder 400 is shown in Table 2.

TABLE 2

| A | B | C | SO | CO |
|---|---|---|----|----|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

In general, the delay time of one stage of exclusive OR gate (referred to as "XOR" hereinafter) is larger than that of other AND or OR gate, or compound gate, and is equivalent to about two stages thereof. For example, the critical path of the 3-input 2-output adder 400 of FIG. 16 goes through two stages of XORs.

FIG. 17 is a block diagram showing a configuration of the 4-input 2-output adder 200. The 4-input 2-output adder 200 for one bit can be constituted of two 3-input 2-output adders 400 for one bit. In this case, the critical path of the adder goes through four stages of XORs.

With devised configuration of the 4-input 2-output adder 200, the delay time required in this case can be further reduced. Table 3 shows a truth table of an exemplary function that the 4-input 2-output adder 200 should satisfy.

TABLE 3

| A | B | C | D | SO | Co | CO |
|---|---|---|---|----|----|----|
| 0 | 0 | 0 | 0 | Ci | 0 | 0 |
| 0 | 0 | 0 | 1 | ¯Ci | 0 | Ci |
| 0 | 0 | 1 | 0 | ¯Ci | 0 | Ci |
| 0 | 0 | 1 | 1 | Ci | 0 | 1 |
| 0 | 1 | 0 | 0 | ¯Ci | 0 | Ci |
| 0 | 1 | 0 | 1 | Ci | 1 | 0 |
| 0 | 1 | 1 | 0 | Ci | 1 | 0 |
| 0 | 1 | 1 | 1 | ¯Ci | 1 | Ci |
| 1 | 0 | 0 | 0 | ¯Ci | 0 | Ci |
| 1 | 0 | 0 | 1 | Ci | 1 | 0 |
| 1 | 0 | 1 | 0 | Ci | 1 | 0 |
| 1 | 0 | 1 | 1 | ¯Ci | 1 | Ci |
| 1 | 1 | 0 | 0 | Ci | 0 | 1 |
| 1 | 1 | 0 | 1 | ¯Ci | 1 | Ci |
| 1 | 1 | 1 | 0 | ¯Ci | 1 | Ci |
| 1 | 1 | 1 | 1 | Ci | 1 | 1 |

FIG. 18 is a circuit diagram of an exemplary circuit which satisfies the truth table of Table 3. The critical path is a path to obtain an output SO of the 4-input 2-output adder 200. The output SO is an exclusive OR of five signals, i.e., inputs A, B, C, D and carry-in signal Ci. As can be seen from FIG. 18, the exclusive OR of the inputs A and B and the exclusive OR of the inputs C and D are parallelly processed, and after all, the critical path goes through three stages of XORs. For convenience, assuming that the delay of the 3-input 2-output adder 400 is two stages of XORs and that of the 4-input 2-output adder 200 is three stages of XORs, discussion will be presented below.

Since the carry-out Co is not propagated across the next bit as mentioned above, the delay times of the addition blocks 22a to 22g and 24a directly depend on the delay times of the adders 200 and 400.

Provided that the multiplicand X and the multiplier Y as inputs of the multiplier are inputted at the same time, the values of the first elements $pp_0$ to $pp_{15}$ and the second elements $pc_0$ to $pc_{15}$ of the partial product generated according to the secondary Booth algorithm are determined at the same time.

In these addition blocks of FIGS. 14A to 14C, the addition is performed in the order of the first stage of the tree circuit (the 4-input 2-output addition blocks 22a to 22d), the second stage (the 4-input 2-output addition blocks 22e and 22f), the third stage (the 4-input 2-output addition block 22g) and the fourth stage (the 3-input 2-output addition block 24a). Accordingly, the delay time from the determination of the first elements $pp_0$ to $pp_{15}$ and the second elements $pc_0$ to $pc_{15}$ of the partial product to the determination of the lower output $so_{28}$ and the upper output $co_{28}$ of the 3-input 2-output addition block 24a as the two eventual intermediate sums is eleven (=3×3+2) stages of XORs since the critical path goes through three stages of 4-input 2-output addition blocks and one stage of 3-2 addition block.

The tree circuit for adding up sixteen partial products to generate the two eventual intermediate sums, which is constituted mainly of 4-input 2-output addition blocks in FIG. 14A, may be constituted of 3-input 2-output addition blocks also in stages other than the final stage of the tree circuit.

FIG. 19 is a block diagram showing a configuration of a tree circuit where the 3-input 2-output addition blocks account for larger part. FIGS. 20A to 20D are block diagrams cooperatively showing the detail of FIG. 19. FIG. 20 is a schematic diagram showing the connection between FIGS. 20A to 20D. FIG. 20A is continuous with FIG. 20B at a virtual line Q29—Q29 and FIG. 20B is continuous with FIG. 20C at a virtual line Q31—Q31. Like FIGS. 14A to 14C, the width of each addition block corresponds to the bit width thereof and the position in a horizontal direction corresponds to the bit position.

Outputs from 4-input 2-output addition blocks 32a to 32d are inputted to 3-input 2-output addition blocks 34a to 34c, outputs from the 3-input 2-output addition blocks 34a to 34c are inputted to 3-input 2-output addition blocks 34d to 34e, and outputs from the 3-input 2-output addition blocks 34d to 34e are inputted to a 4-input 2-output addition block 32e. The 4-input 2-output addition blocks outputs a lower output $so_{40}$ and an upper output $co_{40}$ as the two eventual intermediate sums.

Unlike the tree circuit of FIG. 13, the second elements $pc_j$ are collected in the order of j and inputted to the 4-input 2-output addition block 32a as ppc. That is expressed as $$ppc = \sum_{j=0}^{15} pc_j \cdot 2^{2j} \qquad (4)$$

In FIGS. 19 and 20A to 20D, the addition is performed in the order of the first stage of the tree circuit (the 4-input 2-output addition blocks 32a to 32d), the second stage (the 3-input 2-output addition blocks 34a to 34c), the third stage (the 3-input 2-output addition block 34d and 34e) and the fourth stage (the 4-input 2-output addition block 32e). Accordingly, the delay time from the determination of the first elements $pp_0$ to $pp_{15}$ and the second elements $pc_0$ to $pc_{15}$ of the partial product to the determination of the lower output $so_{40}$ and the upper output $co_{40}$ of the 4-input 2-output addition block 32e as the two eventual intermediate sums is ten (=3×2+2×2) stages of XORs since the critical path goes through two stages of 4-input 2-output addition blocks and two stages of 3-input 2-output addition blocks. Thus, the delay time is improved in this configuration as compared with that of FIGS. 13 and 14A to 14C.

However, there are disadvantages that the number of addition blocks increases by two and the circuit scale is enlarged. That results from that the 3-input 2-output addition block deals with one less inputs parallelly, though its delay time is shorter than that of the 4-input 2-output addition block.

FIG. 21 is a block diagram of a tree circuit for generating the eventual intermediate sums in a circuit for multiplication of a multiplicand and a multiplier of 24-bit signed numbers in the two's complement representation to obtain a product of 48-bit signed number in the two's complement representation. In this circuit, twelve partial products are generated according to the secondary Booth algorithm, and added up in the form of a tournament while being compressed to eventually provide the two eventual intermediate sums.

The tree circuit is constituted of 4-input 2-output addition blocks 42a to 42e and a 3-input 2-output addition block 44a. In these addition blocks, the addition is performed in the order of the first stage of the tree circuit (the 4-input 2-output addition blocks 42a to 42c), the second stage (the 4-input 2-output addition block 42d and the 3-input 2-output addition block 44a) and the third stage (the 4-input 2-output addition block 42e), and ppc is expressed as $$ppc = \sum_{j=0}^{11} pc_j \cdot 2^{2j} \qquad (5)$$

In a case of three stages of 4-input 2-output addition blocks (through the addition blocks 42a (or 42b), 42d and 42e), the delay time is longer than a case of two stages of 4-input 2-output addition blocks and one stage of 3-input 2-output addition block (through the addition blocks 42c, 44a and 42e). Accordingly, the delay time from the determination of the first elements $pp_0$ to $pp_{11}$ and the second elements $pc_0$ to $pc_{11}$ of the partial product to the determination of the lower output $so_{46}$ and the upper output $co_{46}$ of the 4-input 2-output addition block 42e as the two eventual intermediate sums is nine stages of XORs which corresponds to three stages of 4-input 2-output addition blocks.

As discussed above, the times for determination of input data of the 4-input 2-output addition block 42e in the two cases are not the same. Specifically, the lower output $so_{45}$ and the upper output $co_{45}$ of the 3-input 2-output addition block 44a are determined earlier than the lower output $so_{44}$ and the upper output $co_{44}$ of the 4-input 2-output addition block 42d by one stage of XOR. Further, the first element $pp_{11}$ of the input data of 3-input 2-output addition block 44a is determined earlier than the lower output $so_{43}$ and the upper output $co_{43}$ of the 4-input 2-output addition block 42c by three stages of XORs.

In the background art, the circuit operation of the tree circuit is performed with low parallelism in some cases depending on the bit width of the input data for multiplication. In other words, disadvantageously, speeding-up of the multiplier is not achieved because the timing of determining the input data of the circuit blocks constituting the tree circuit is not uniform.

SUMMARY OF THE INVENTION

The present invention is directed to a tree circuit. According to a first aspect of the present invention, the tree circuit which performs a tournament addition on the basis of a plurality of partial products generated according to Booth algorithm, generating intermediate sums to be compressed, to output a pair of eventual intermediate sums, comprises: regular addition blocks for adding a plurality of plural-number-bit data to output a pair of the intermediate sums; and an extended addition block for adding a plurality of plural-number-bit data and one-bit data to output a pair of the intermediate sums.

According to a second aspect of the present invention, in the tree circuit of the first aspect, each of the plurality of partial products is expressed as a product obtained by multiplying a sum of a first element of a plurality of bits and a second element of one bit by a scale and the extended addition block receives the plurality of partial products and further receives the second element which belongs to one of the plurality of partial products other than those inputted to be thereto.

According to a third aspect of the present invention, in the tree circuit of the second aspect, the second element inputted to the extended addition block belongs to the partial product which has the largest scale among the plurality of partial products.

According to a fourth aspect of the present invention, in the tree circuit of the third aspect, the partial product which has the smallest scale among the plurality of partial products is inputted to the extended addition block.

According to a fifth aspect of the present invention, in the tree circuit of the fourth aspect, the extended addition block has extended adders, the number of which is a predetermined number, located on a specific bit position which is the bit position of the second element inputted therein and higher; and regular adders located lower than the specific bit position, and the extended adders each have one more upward-propagation outputs for outputting data to the higher-next bit as compared with the regular adders which constitute the regular addition block.

According to a sixth aspect of the present invention, in the tree circuit of the fifth aspect, the extended addition block further has an adder higher than the extended adders, and the adder located higher next to the highest one of the extended adders receives one of the upward-propagation outputs as an input other than a carry-in.

According to a seventh aspect of the present invention, in the tree circuit of the fifth aspect, the extended adders each have four inputs other than the upward-propagation outputs given from the lower-next bit position and one of the upward-propagation outputs takes either of different values depending on whether all of the four inputs have "1"s or not.

According to an eighth aspect of the present invention, in the tree circuit of the seventh aspect, the upward-propagation outputs propagating between a plurality of the extended adders are generated as a pair of pseudo carry-outs and can be expressed as results of two predetermined arithmetic operations performed for a pair of carry-outs generated in the regular adders, and the carry-outs are commutative in both the two predetermined arithmetic operations.

According to a ninth aspect of the present invention, in the tree circuit of the eighth aspect, the extended adder located on the specific bit position receives a carry-out from the lower-next bit position and the second element inputted to the extended addition block and propagates the pseudo carry-outs to the extended adder located on the higher-next bit position.

According to a tenth aspect of the present invention, in the tree circuit of the ninth aspect, the extended addition block further has a regular adder higher than the extended adders, and the highest one of the extended adders receives the pair of pseudo carry-outs from the lower-next bit position and outputs a pair of carry-outs to the regular adder located on the higher-next bit position.

In the tree circuit of the first aspect, the extended addition block receives data more than the regular addition block by one bit. Therefore, the tree circuit needs no other addition block for adding the two compressed intermediate sums and this one bit to obtain the eventual intermediate sums.

In the tree circuit of the second aspect, since the extended addition block is located in the first stage of the tree circuit, the intermediate sums are given to the second stage of the tree circuit (where the intermediate sums obtained in the first stage are further added) in adjustment of timing. Therefore, higher-speed processing can be achieved by adjusting the timing of obtaining the intermediate sums, without increase in circuit scale.

Larger-scaled configuration is needed on the bit position of the second element inputted to the extended addition block and higher, as compared with the configuration on the other bit positions. In the tree circuit of the third aspect, the second element of which the bit position is the highest is selected to be inputted to the extended addition block, thereby suppressing an increase in configuration scale of the extended addition block.

In the tree circuit of the fourth aspect, the addition block which includes the bit position where the largest number of partial products are added (in other words, the number of partial products to be added is equal to the number of partial products to be inputted) is the lowest serves as the extended addition block. On the bit position where the number of partial products to be added is smaller than the number of partial products to be inputted and higher, it is possible to deal with the inputted second element, without enlargement in configuration scale of the extended addition block. In other words, in the configuration of the extended addition block, although the configuration scale is enlarged on the bit position of the second element inputted thereto and higher, enlargement of that portion can be suppressed and further enlargement in configuration scale of the extended addition block can be suppressed.

For the second element to be inputted to the extended addition block, the adder on the specific bit position may have one-bit more upward-propagation outputs than the adders on the lower bit positions. Since the upward-propagation output is propagated to the bit position higher than the specific bit position, one-bit more upward-propagation outputs are needed also on a bit position higher than the specific bit position. For that, in the tree circuit of the fifth aspect, the extended adder having one-bit more upward-propagation outputs is provided on the specific bit position and higher.

In the tree circuit of the sixth aspect, a regular adder may be employed for the adder located higher next to the extended adder on the most significant order (the most significant-order extended adder) since it receives the upward-propagation output from the most significant-order extended adder by an input other than the carry-in.

In the tree circuit of the seventh aspect, the configuration to obtain one of the upward-propagation outputs is simplified and therefore it is possible to suppress an enlargement in configuration scale of the extended adder and further in configuration scale of the extended addition block.

In the tree circuit of the eighth aspect, the upward-propagation output may not have a meaning of carry and the pseudo carry-outs are propagated to higher bit position to simplify the configuration of the extended adder.

In the tree circuit of the ninth aspect, the extended adder for adjusting the regular adder located lower than the specific bit position and the extended adder which receives the pseudo carry-outs is provided, and that allows regular addition under the specific bit position and propagation of the pseudo carry-outs between the extended adders at the same time.

In the tree circuit of the tenth aspect, the extended adder for propagating the pseudo carry-outs to higher bit position and the extended adder for adjusting this extended adder for propagation and the regular adder located higher are provided, and that allows the regular addition in the regular adder located higher than the extended adder while propagating the pseudo carry-outs between the extended adders.

Accordingly, an object of the present invention is to improve the parallel operation of the parallel multiplier circuit using the secondary Booth algorithm and to speed up the multiplier without remarkable increase in circuit scale.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are block diagrams cooperatively showing a configuration of an extended 4-input 2-output addition block 1a;

FIG. 7 is a block diagram showing part of the configuration of extended 4-input 2-output addition block 1a;

FIGS. 11A to 11B are block diagrams cooperatively showing a configuration of an extended 3-input 2-output addition block 13a;

FIGS. 15A to 15C are block diagrams cooperatively showing a configuration of a 4-input 2-output addition block 22a;

DESCRIPTION OF THE PREFERRED EMBODIMENTS

The First Preferred Embodiment

Figure 1:
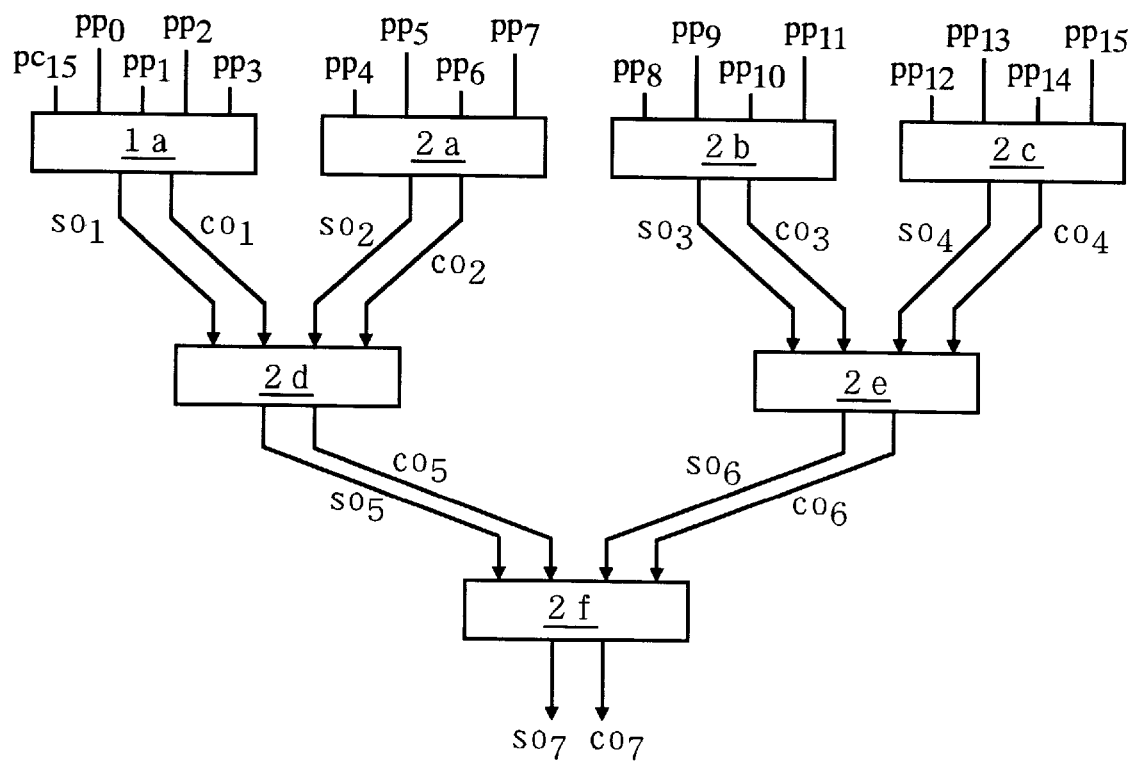
FIG. 1 is a block diagram showing a first preferred embodiment of the present invention.

FIG. 1 is a block diagram showing part of a configuration of a multiplier in accordance with a first preferred embodiment of the present invention. Multiplier and multiplicand are 32-bit signed numbers in the two's complement representation, and sixteen partial products $P_0$ to $P_{15}$ are obtained according to the secondary Booth algorithm. This figure does not show a function to generate these partial products but schematically shows a tree circuit which compresses the intermediate sums to eventually generate two eventual intermediate sums. As discussed in the background art, a partial product $P_j$ depends on the first element $pp_j$ of 33-bit width, the second element $pc_j$ of 1-bit width and $2j$ representing the least significant bit position.

The tree circuit of the first preferred embodiment is constituted of a circuit block 1a for parallelly adding four input data of a plurality of bits and one input data of one bit (the circuit block will be hereinafter referred to as "extended 4-input 2-output addition block") and 4-input 2-output addition blocks 2a to 2f.

The second element $pc_{15}$ of the partial product which is given to the 3-input 2-output addition block 24a in the background art is applied to the extended 4-input 2-output addition block 1a in the first preferred embodiment. That eliminates the need for the 3-input 2-output addition block 24a.

The extended 4-input 2-output addition block 1a receives the second element $pc_{15}$ and the first elements $pp_0$ to $pp_3$ of the partial product and outputs an upper output $co_1$ and a lower output $so_1$. The 4-input 2-output addition block 2a receives the first elements $pp_4$ to $pp_7$ and outputs an upper output $co_2$ and a lower output $so_2$ as intermediate sums. The 4-input 2-output addition block 2b receives the first elements $pp_8$ to $pp_{11}$ and outputs an upper output $co_3$ and a lower output $so_3$ as intermediate sums. The 4-input 2-output addition block 2c receives the first elements $pp_{12}$ to $pp_{15}$ and outputs an upper output $co_4$ and a lower output $so_4$ as intermediate sums. The 4-input 2-output addition block 2d receives the upper outputs $co_1$ and $co_2$ and the lower outputs $so_1$ and $so_2$ and outputs an upper output $co_5$ and a lower output $so_5$ as intermediate sums. The 4-input 2-output addition block 2e receives the upper outputs $co_3$ and $co_4$ and the lower outputs $so_3$ and $so_4$ and outputs an upper output $co_6$ and a lower output $so_6$ as intermediate sums. The 4-input 2-output addition block 2f receives the upper outputs $co_5$ and $co_6$ and the lower outputs $so_5$ and $so_6$ and outputs an upper output $co_7$ and a lower output $so_7$ as eventual intermediate sums. The upper output $co_7$ and the lower output $so_7$ are eventually added up by a final addition block (not shown) to provide a multiplication result. The above discussion gives an outline and detailed discussion will be presented, referring to FIGS. 2A to 2C.

Figure 2:
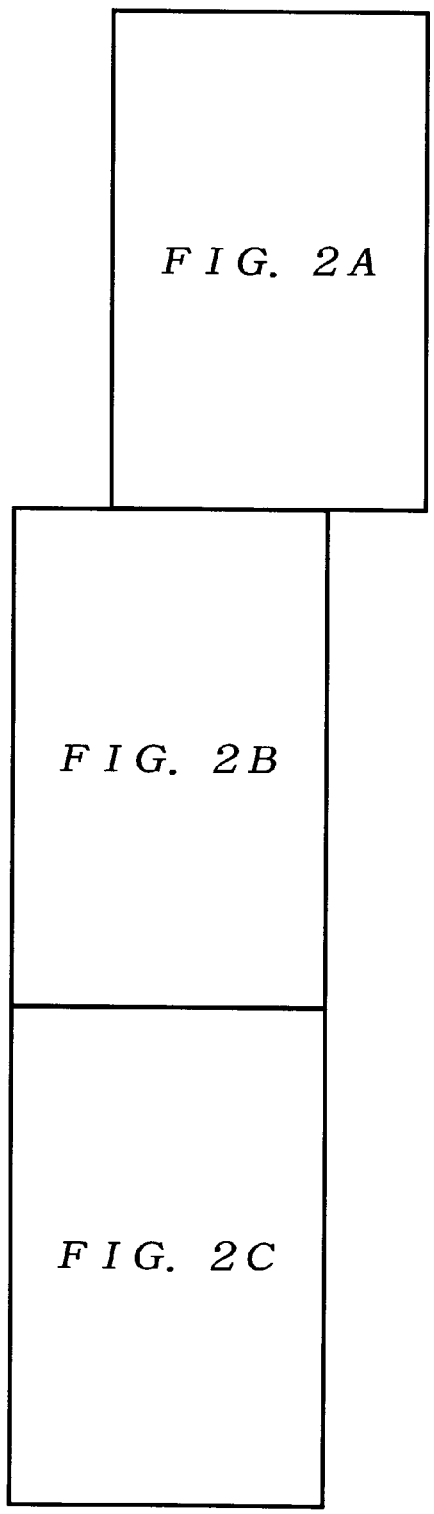
FIG. 2 is a schematic diagram showing the connection between FIGS. 2A to 2C.
Figure 2A:
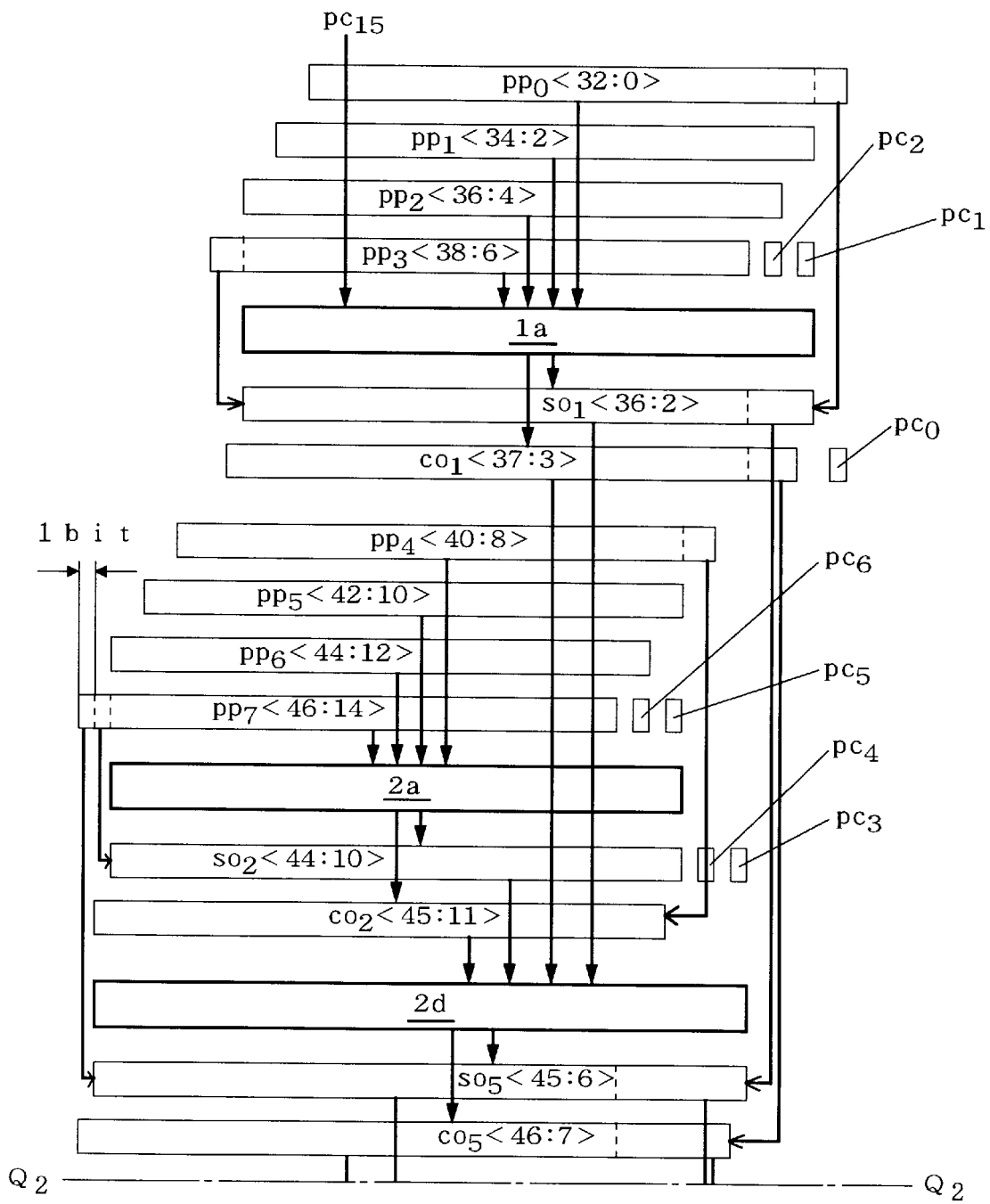
FIGS. 2A to 2C are block diagrams cooperatively showing the detail of FIG. 1.
Figure 2B:
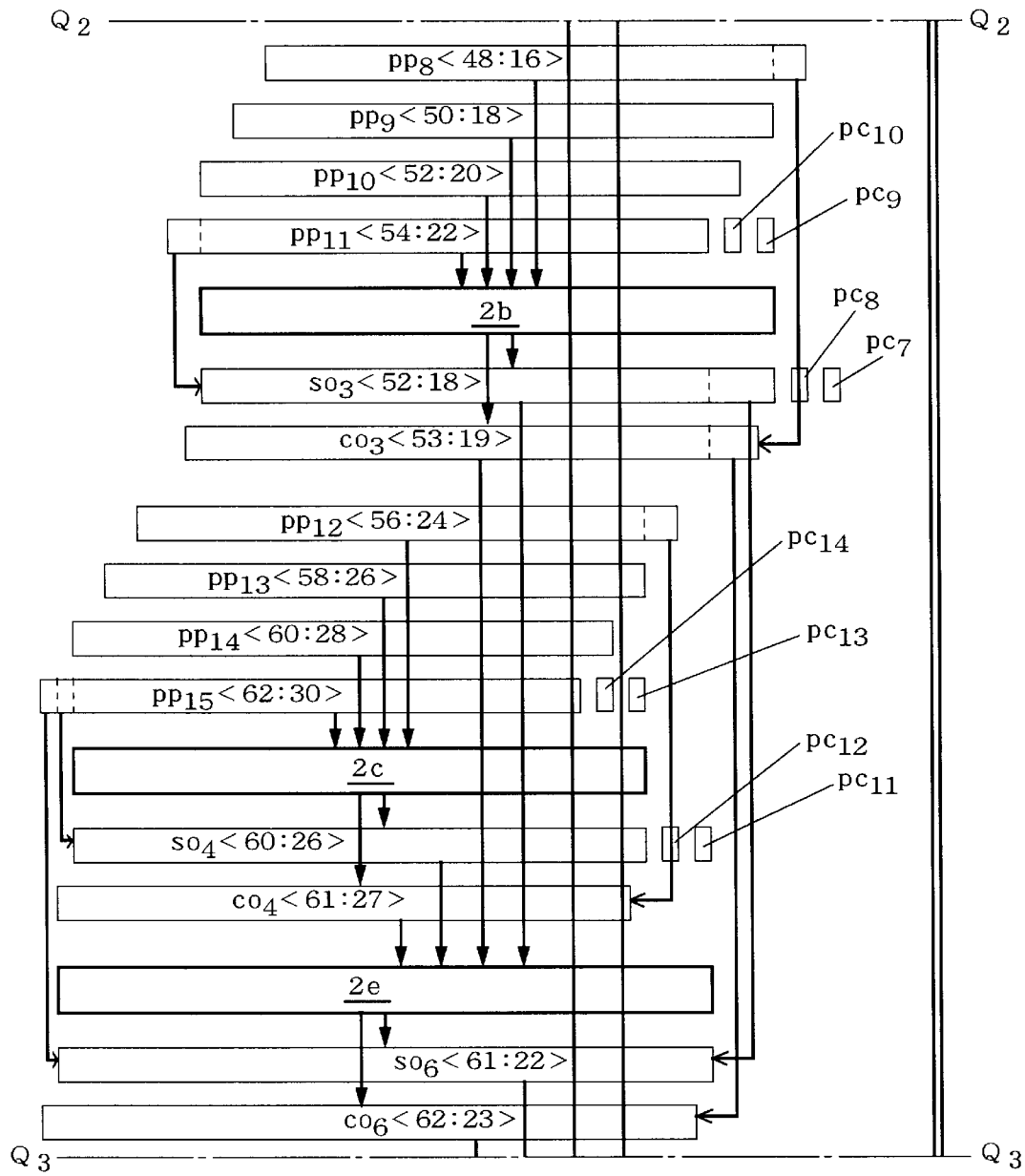
Figure 2C:
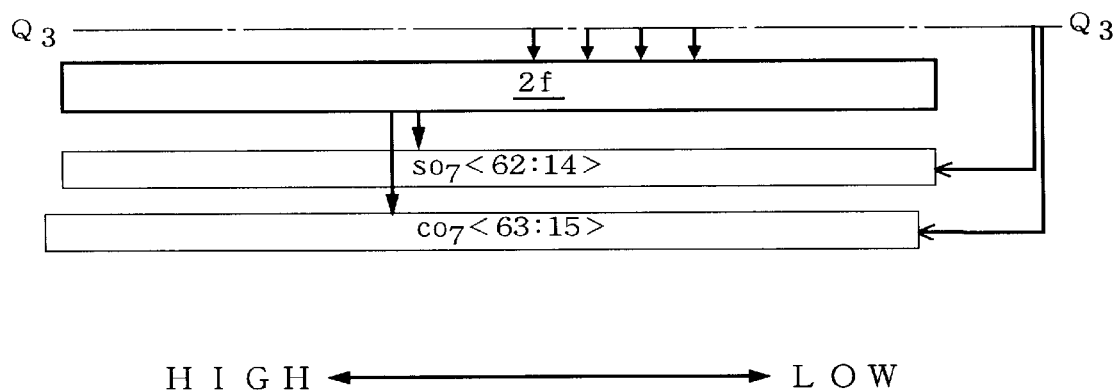

FIGS. 2A to 2C are block diagrams cooperatively showing the detail of FIG. 1. FIG. 2 is a schematic diagram showing the connection between FIGS. 2A to 2C. FIG. 2A is continuous with FIG. 2B at a virtual line Q2—Q2 and FIG. 2B is continuous with FIG. 2C at a virtual line Q3—Q3. The width of each addition block corresponds to the bit width thereof and the position in a horizontal direction corresponds to the bit position.

The second to thirty-second bits of the first element $pp_0$ <32:0> of the partial product $P_0$, all bits of the first element $pp_1$ <34:2> and the second element $pc_1$ of the partial product $P_1$, all bits of the first element $pp_2$ <36:4> and the second element $pc_2$ of the partial product $P_2$, the sixth to thirty-sixth bits of the first element $pp_3$ <38:6> of the partial product $P_3$ and the second element $pc_{15}$ of the partial product $P_{15}$ are inputted to the extended 4-input 2-output addition block 1a, adjusting the bit positions. (<u:v> indicates that the data represented by the preceding characters range from v-th to u-th bits, counted from the zeroth bit, i.e., the least significant bit of the multiplication result, and the bit position is expressed as n-th counted from the least significant order of the multiplication result).

The second element $pc_1$ of the partial product $P_1$ and the second element $pc_2$ of the partial product $P_2$ are dealt with as pseudo lower bits of the first element $pp_3$ of the partial product $P_3$.

The second element $pc_0$ of the partial product $P_0$ is propagated to the final addition block (not shown) since no other data are located on its bit position (the zeroth bit).

The thirty-seventh and thirty-eighth bits of the first element $pp_3$ of the partial product $P_3$ are dealt with as pseudo upper bits of the lower output $so_1$ <36:2> of the extended 4-input 2-output addition block $1a$ and propagated to the 4-input 2-output addition block $2d$ since the extended 4-input 2-output addition block $1a$ does not cover the bit positions.

The second element $pc_3$ is not added in the extended 4-input 2-output addition block $1a$ and is propagated to the 4-2 addition block $2d$ since four data to be given to its bit position (the sixth bit) already exist.

The zeroth and first bits of the first element $pp_0$ of the partial product $P_0$ are dealt with as pseudo lower bits of the lower output $so_1$ of the extended 4-input 2-output addition block $1a$ since the extended 4-input 2-output addition block $1a$ does not cover the bit positions.

Since the first elements $pp_2$ and $pp_3$ are not given to the bit positions of the second elements $pc_1$ and $pc_2$ respectively, the background-art 4-input 2-output adders 200 may be used on these positions of the extended 4-input 2-output addition block $1a$. However, the four first elements $pp_0$ to $pp_3$ are also located on the bit position of the second element $pc_{15}$, i.e., the thirtieth bit. Therefore, the extended 4-input 2-output addition block $1a$ on this bit position at least must include a 6-input adder, and specifically, for the four first elements $pp_0$ <30>, $pp_1$ <30>, $pp_2$ <30>, $pp_3$ <30> (<w> indicates a bit position), the second element $pc_{15}$ and a carry-out Co of the 4-input 2-output adder 200 located on the twenty-ninth bit.

Furthermore, the adder located on the thirtieth bit (referred to as "extended 4-input 2-output adder" hereinafter) has to output two carry-outs. Since six 1-bit data are inputted, the addition result is six in decimal notation at the maximum. To propagate the carry-out only to the next bit, arithmetic operation is executed using a carry with weight of $2^1$ with respect to the bit position of the input data but can not be executed using a carry with weight of $2^2$. Naturally, for an addition result of odd number in decimal notation, an output with weight of $2^0$ with respect to the bit position of the input data (i.e., on the same position) is also needed. Therefore, the extended 4-input 2-output adder outputs the lower output SO with weight of $2^0$ and the upper output CO with weight of $2^1$ (which correspond to the lower output so for one bit and the upper output co for one bit, respectively) and further propagate the first carry-out Co1 and the second carry-out Co2 both having weight of $2^1$ to the adder located on the higher-next bit.

The first principle is that the adder located higher than the bit position of second element $pc_{15}$ has to receive the four first elements $pp_0$ to $pp_3$ and the first and second carry-outs Co1 and Co2 given from the extended 4-input 2-output adder in the lower-next position, and hence the extended 4-input 2-output adder should be employed therefor.

In the extended 4-input 2-output addition block $1a$ located on the thirty-third bit or higher, one input is not needed since the most significant bit of the first element $pp_0$ is located on the thirty-second bit. Accordingly, the second principle is that the extended 4-input 2-output addition block $1a$ may be constituted of regular 4-input 2-output adders on the thirty-third bit or higher even if there are two carry-outs from the lower positions.

According to the first and second principles, the 4-input 2-output adders 200 used in the background-art 4-input 2-output additional block have to be replaced by the extended 4-input 2-output adders for the bit position of the second element $pc_{15}$ of the highest partial product $P_{15}$ and higher and on the most significant bit position of the first element $pp_0$ of the lowest partial product $P_0$ and lower.

Furthermore, due to the complement to the first and second principles according to "one-addition technique" discussed later, the extended 4-input 2-output adder is needed on the still higher bit position. Detailed discussion on the configuration of the extended 4-input 2-output addition block and brief discussion on the above complement will be presented below.

Figure 3A:
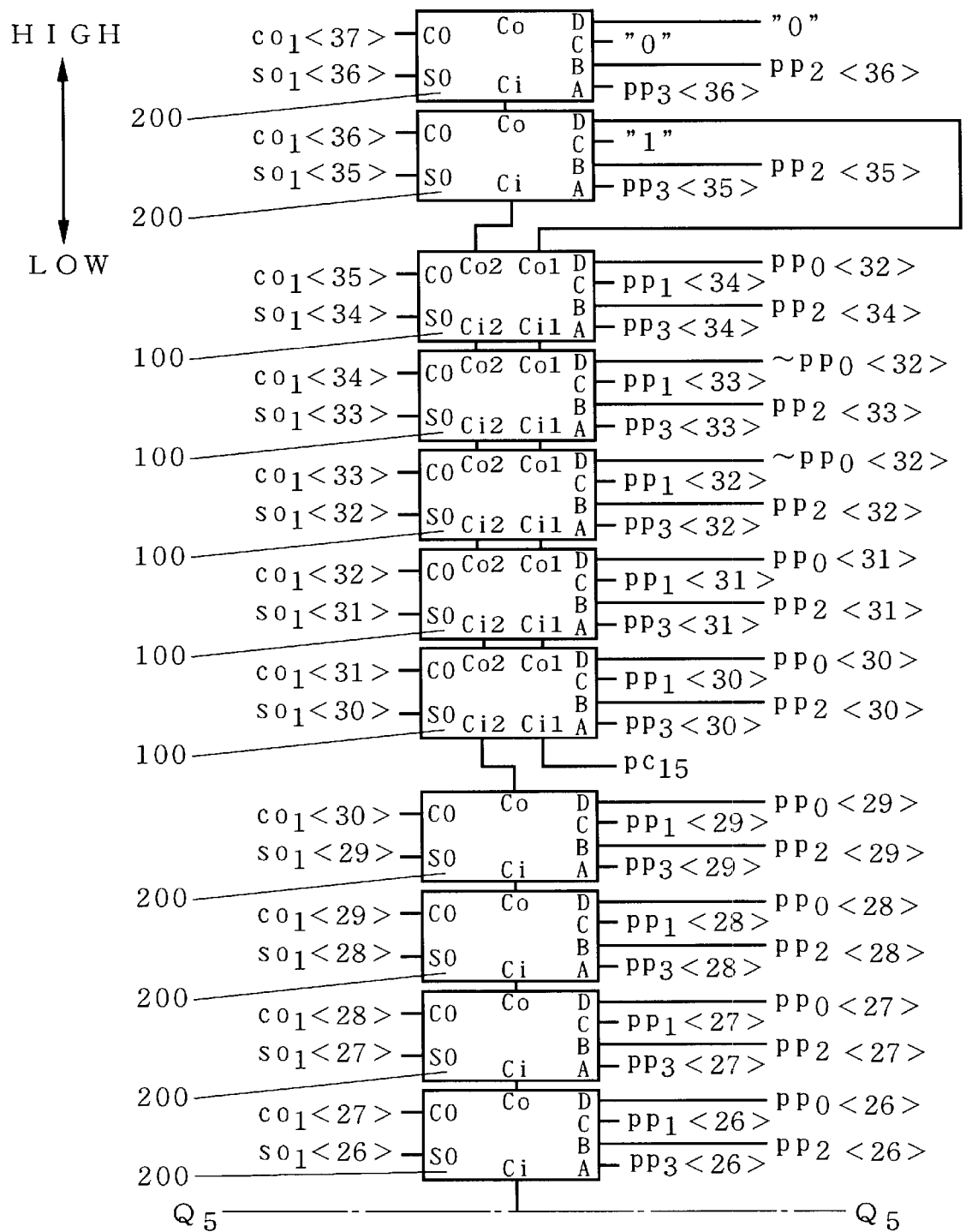
Figure 3B:
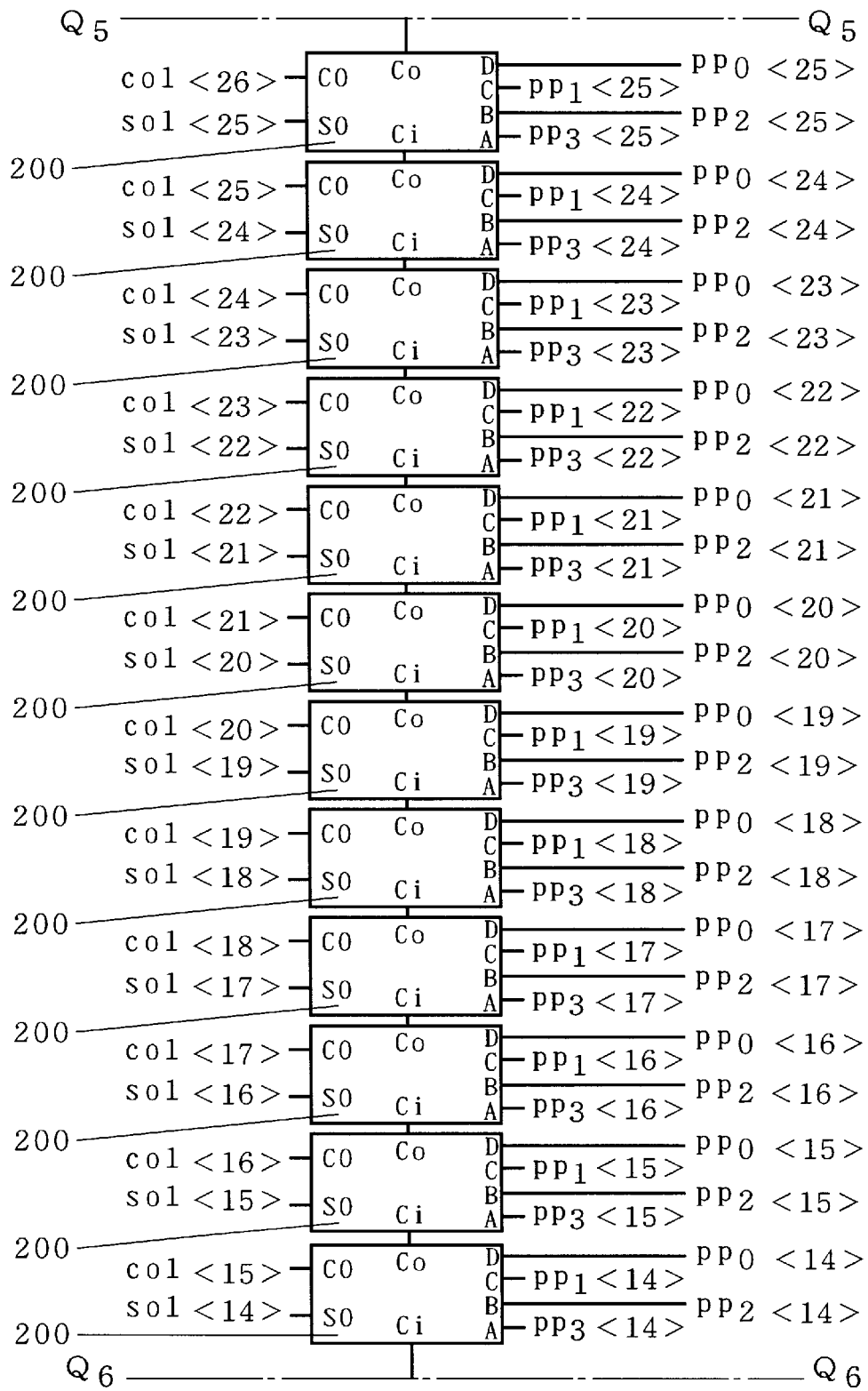
Figure 3C:
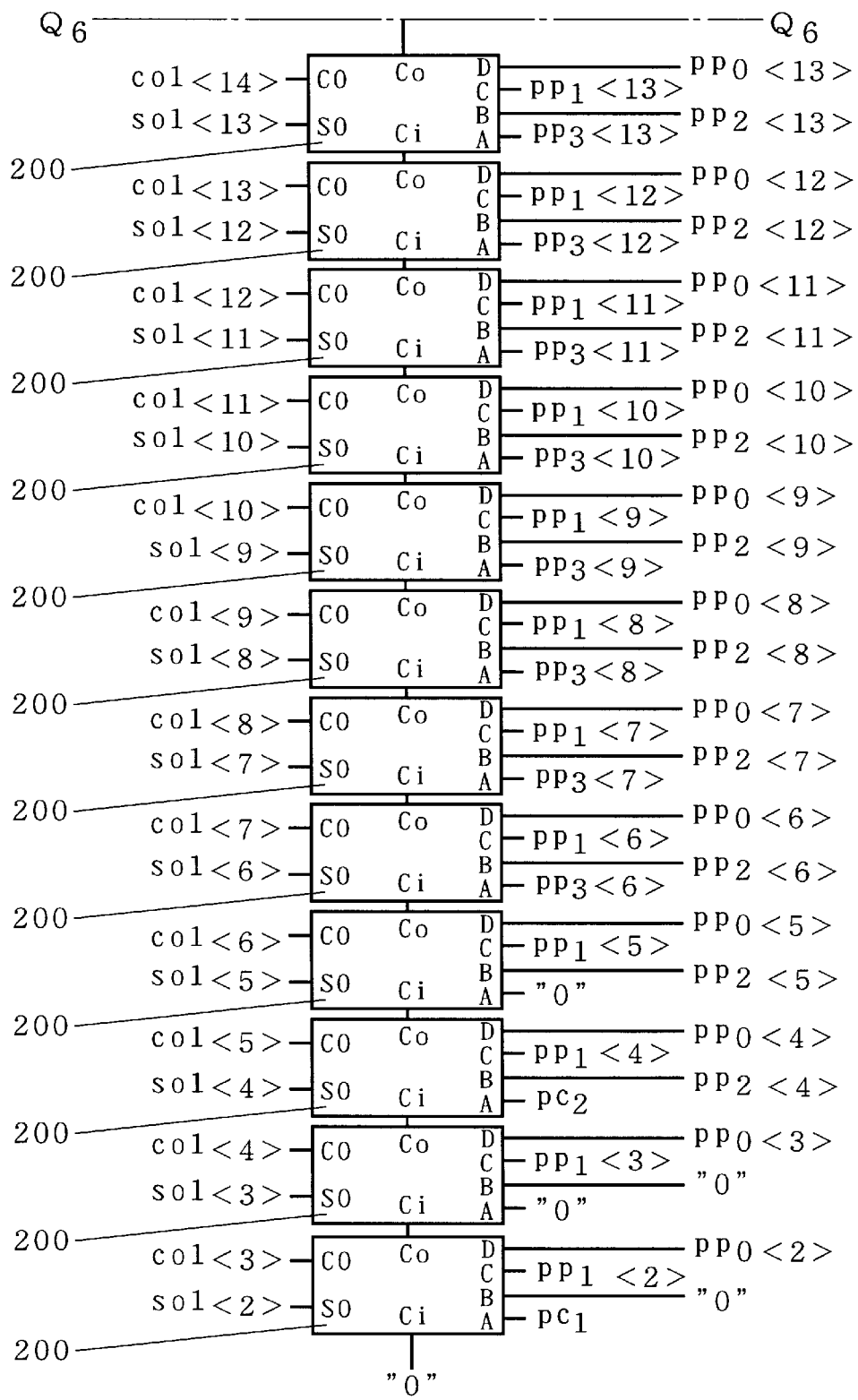

FIGS. 3A to 3C are block diagrams cooperatively showing a configuration of the extended 4-input 2-output addition block $1a$. FIG. 3A is continuous with FIG. 3B at a virtual line Q5—Q5 and FIG. 3B is continuous with FIG. 3C at a virtual line Q6—Q6.

In the extended 4-input 2-output addition block $1a$ for parallel addition of 35-bit data, five extended 4-input 2-output adders 100 each for one bit are located on the thirtieth to thirty-fourth bits, and twenty-eight 4-input 2-output adders 200 each for one bit are located on the second to twenty-ninth bits and two 4-input 2-output adders 200 each for one bit are located on the thirty-fifth and thirty-sixth bits.

"0" is inputted to the carry-in Ci of the 4-input 2-output adder 200 on the zeroth bit since no carry is given from the lower position. Then, the carry-out Co of the 4-input 2-output adder 200 is sequentially given to the higher-next 4-input 2-output adder 200 as the carry-in Ci.

The carry-out Co of the 4-input 2-output adder 200 on the twenty-ninth bit is given to the higher-next extended 4-input 2-output adder 100 as the second carry-in Ci2. The first and second carry-outs Co1 and Co2 of the extended 4-input 2-output adders 100 on the thirtieth to thirty-third bits are given to the extended 4-input 2-output adders 100 on the thirty-first to the thirty-fourth bits, respectively, as the first and second carry-ins Ci1 and Ci2.

The second element $pc_{15}$ of the partial product $P_{15}$ is inputted to the first carry-in Ci1 of the extended 4-input 2-output adder 100 on the thirtieth bit. The first carry-in Ci1 is regarded as a parity of the four first elements $pp_0$ <30>, $pp_1$ <30>, $pp_2$ <30> and $pp_3$ <30> in weight of the thirtieth bit position, complying with the first principle. Naturally, for the same reason, the second element $pc_{15}$ of the partial product $P_{15}$ may be inputted to the second carry-in Ci2 of the extended 4-input 2-output adder 100 on the thirtieth bit and the carry-out Co of the 4-input 2-output adder 200 on the twenty-ninth bit may be inputted to the first carry-in Ci1.

The first and second carry-outs Co1 and Co2 of the extended 4-input 2-output adder 100 on the thirty-fourth bit are given to the 4-input 2-output adder 200 as one of its inputs ("D" in FIG. 3A) and the carry-in Ci. The carry-out Co of the 4-input 2-output adder 200 on the thirty-fifth bit is given to the 4-input 2-output adder 200 on the thirty-sixth bit as the carry-in Ci.

The four first elements $pp_0$ to $pp_3$ are given to the four inputs A to D of the 4-input 2-output adder 100 or 200 on the corresponding bit position, adjusting the bit position. On a bit-by-bit basis, the 4-input 2-output adder 100 or 200 outputs the upper output CO and the lower output SO, which correspond to the upper output co1 and lower output $so_1$ for each bit of the extended 4-input 2-output addition block $1a$.

The first element $pp_2$ has no data to be located on the second and third bit positions and the first element $pp_3$ has no data to be located on the second to fifth bit positions. On the other hand, the second elements $pc_1$ and $pc_2$ are located on the second and fourth bit positions, respectively. Accordingly, the second element $pc_1$ and "0" are given to the inputs A and B of the 4-input 2-output adder 200 on the second bit respectively, "0" is given to the inputs A and B of the 4-input 2-output adder 200 on the third bit, the second element $pc_2$ is given to the input A of the 4-input 2-output adder 200 on the fourth bit and "0" is given to the input A of the 4-input 2-output adder 200 on the fifth bit.

According to the first and second principles, only three extended 4-input 2-output adders 100 are needed for the thirtieth to thirty-second bits and the regular 4-input 2-output adders 200 are located on the thirty-third and thirty-fourth bits. However, as shown in FIG. 3A, the inverted value of the first element $pp_0$ <32>, instead of the first element $pp_0$ <32>, is inputted to the input D of the extended 4-input 2-output adder 100 on the thirty-second bit, the inverted value of the first element $pp_0$ <32>, instead of "0", is inputted to the input D of the extended 4-input 2-output adder 100 on the thirty-third bit, the first element $pp_0$ <32>, instead of "0", is inputted to the input D of the extended 4-input 2-output adder 100 on the thirty-fourth bit, and "1", instead of "0", is given to the input C of the 4-input 2-output adder 200 on the thirty-fifth bit.

Thus, change of summand in the arithmetic operation of signed numbers in the two's complement representation is well-known technique, termed "one-addition technique" (not discussed in detail herein), for simple signed-bit extension. Since this technique is generally used, the extended 4-input 2-output adders 100 more than required according to the first and second principles by a prescribed number are needed in higher bit (complement to the first and second principles) in the first preferred embodiment. The prescribed number depends on how many orders are used in the Booth algorithm to generate the partial products, and is herein two.

The two first elements $pp_2$ <35> and $pp_3$ <35> are inputted in the thirty-fifth bit and further "1" which is needed according to the one-addition technique and the first carry-out Co1 on the thirty-fourth bit are inputted therein. Therefore, for the thirty-fifth bit, the regular 4-input 2-output adder 200 may be used since it only has to add these four inputs. It is natural that the regular 4-input 2-output adder 200 may be used also for the thirty-sixth bit since the carry-out Co from the 4-input 2-output adder 200 on the thirty-fifth bit is inputted as the carry-in Ci and the first elements $pp_0$ and $pp_1$ are not inputted in the thirty-sixth bit.

Furthermore, since the carry-in Ci and the inputs C and D of the 4-input 2-output adder 200 on the thirty-fifth bit have the same weight, these are exchangeable for each other. The first and second Ci1 and Ci2 of the extended 4-input 2-output adder 100 are also exchangeable.

Now, the above extended 4-input 2-output adder 100 will be discussed below. The extended 4-input 2-output adder 100 receives six data of one bit and outputs the lower output SO1 for its bit and three outputs for higher-next bit, i.e., the first and second carry-outs Co1 and Co2 and the upper output CO.

Accordingly, the following expression is true:

$$A+B+C+D+Ci1+Ci2=2(Co1+Co2+CO)+SO \qquad (6)$$

As to one of the extended 4-input 2-output adders 100, the sum of the values of the first and second carry-outs Co1 and Co2 of the lower-next extended 4-input 2-output adder 100 is at most "2" in decimal notation and affects limitedly the upper output CO and the lower output SO to be outputted from that extended 4-input 2-output adder 100. In other words, the first and second carry-outs Co1 and Co2 depend only on the four inputs A to D. Therefore, the carry is not propagated higher by more than one bit.

The first and second carry-outs Co1 and Co2 depend only on the numbers of "1"s of the four inputs A to D, and the upper output CO reflects the first and second carry-ins Ci1 and Ci2. If the four inputs A to D have one or less "1", there is no carry and both the first and second carry-outs Co1 and Co2 are "0". If the four inputs A to D have two or three "1"s, the first carry-out Co1 is "1" and the second carry-out Co2 is "0". If the four inputs A to D have four "1"s, both the first and second carry-outs Co1 and Co2 are "1".

On the other hand, the lower output SO defines whether the output of the extended 4-input 2-output adder 100 is odd or even number in decimal notation, and depends on whether the number of "1"s of the four inputs A to D and the first and second carry-ins Ci1 and Ci2 is odd or even number.

The upper output CO takes "1" when both the first and second carry-ins Ci1 and Ci2 are "1" or when the four inputs A to D have odd number of "1"s, even if either the first or second carry-in Ci1 or Ci2 is "1", and otherwise "0".

In summary, the above relation is shown as Table 4.

TABLE 4

| A | B | C | D | SO | Co1 | Co2 | CO |
|---|---|---|---|---|---|---|---|
| 0 | 0 | 0 | 0 | Ci1 ^ Ci2 | 0 | 0 | Ci1 & Ci2 |
| 0 | 0 | 0 | 1 | ~(Ci1 ^ Ci2) | 0 | 0 | Ci1 \| Ci2 |
| 0 | 0 | 1 | 0 | ~(Ci1 ^ Ci2) | 0 | 0 | Ci1 \| Ci2 |
| 0 | 0 | 1 | 1 | Ci1 ^ Ci2 | 1 | 0 | Ci1 & Ci2 |
| 0 | 1 | 0 | 0 | ~(Ci1 ^ Ci2) | 0 | 0 | Ci1 \| Ci2 |
| 0 | 1 | 0 | 1 | Ci1 ^ Ci2 | 1 | 0 | Ci1 & Ci2 |
| 0 | 1 | 1 | 0 | Ci1 ^ Ci2 | 1 | 0 | Ci1 & Ci2 |
| 0 | 1 | 1 | 1 | ~(Ci1 ^ Ci2) | 1 | 0 | Ci1 \| Ci2 |
| 1 | 0 | 0 | 0 | ~(Ci1 ^ Ci2) | 0 | 0 | Ci1 \| Ci2 |
| 1 | 0 | 0 | 1 | Ci1 ^ Ci2 | 1 | 0 | Ci1 & Ci2 |
| 1 | 0 | 1 | 0 | Ci1 ^ Ci2 | 1 | 0 | Ci1 & Ci2 |
| 1 | 0 | 1 | 1 | ~(Ci1 ^ Ci2) | 1 | 0 | Ci1 \| Ci2 |
| 1 | 1 | 0 | 0 | Ci1 ^ Ci2 | 1 | 0 | Ci1 & Ci2 |
| 1 | 1 | 0 | 1 | ~(Ci1 ^ Ci2) | 1 | 0 | Ci1 \| Ci2 |
| 1 | 1 | 1 | 0 | ~(Ci1 ^ Ci2) | 1 | 0 | Ci1 \| Ci2 |
| 1 | 1 | 1 | 1 | Ci1 ^ Ci2 | 1 | 1 | Ci1 & Ci2 |

Table 4 shows the first example of a truth table of input-output relation that the extended 4-input 2-output adder 100 should satisfy. The truth table of Table 4 is expressed in Boolean expression as $$Co1=(A|B)\&(C|D)|(A\&B|C\&D)$$

$$Co2=A\&B\&C\&D$$

$$SO=A\char`\^B\char`\^C\char`\^D\char`\^Ci1\char`\^Ci2$$

$$CO=\sim(A\char`\^B\char`\^C\char`\^D)\&(Ci1\&Ci2)|(A\char`\^B\char`\^C\char`\^D)\&(Ci1|Ci2) \qquad (7)$$

where "~" represents logical inversion, "|" represents logical sum, "&" represents logical product and "^" represents exclusive logical sum.

Figure 4:
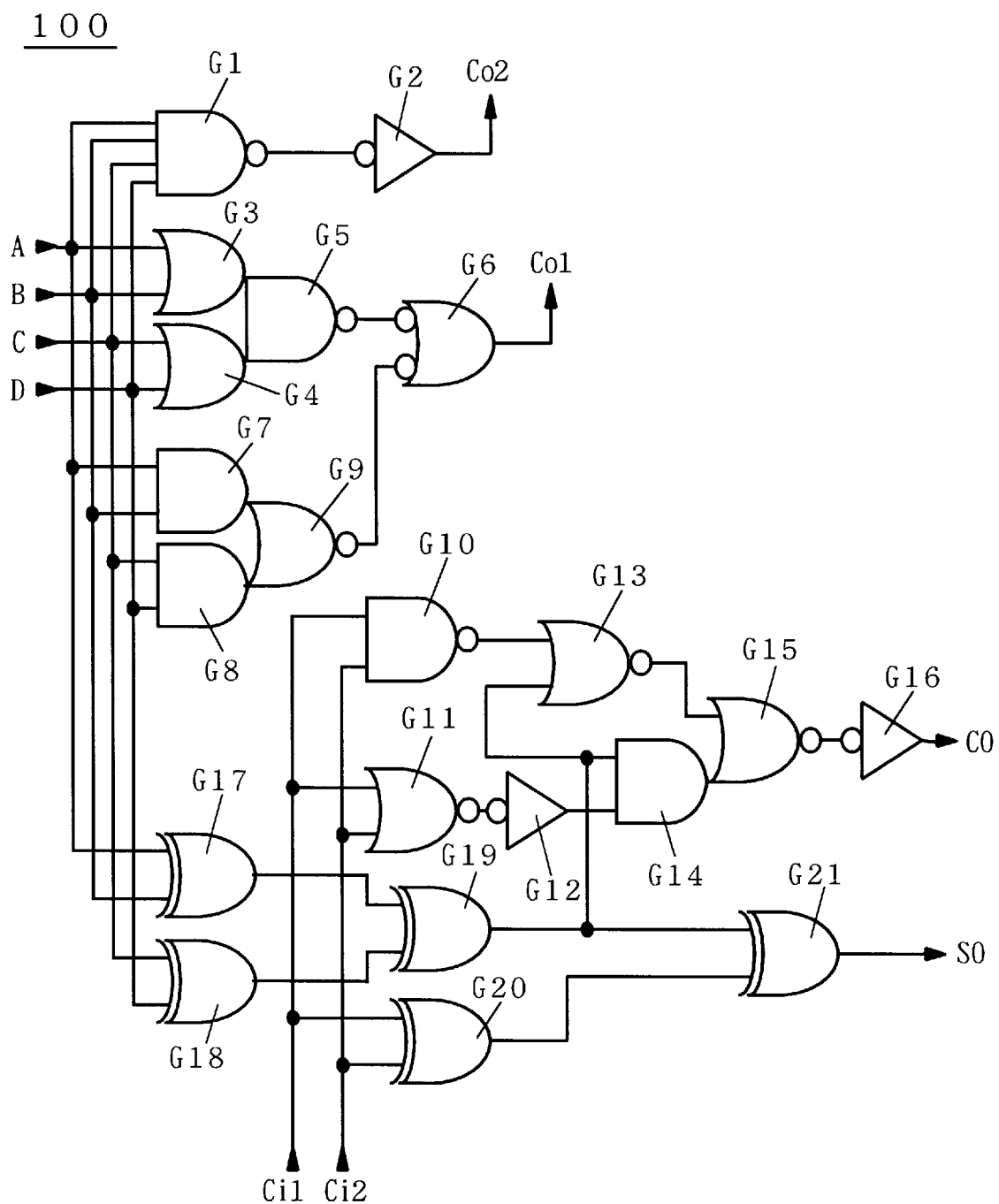
FIG. 4 is a circuit diagram of the first example of a configuration of an extended 4-input 2-output adder 100.

FIG. 4 is a circuit diagram of the first example of a configuration of the extended 4-input 2-output adder 100 on the basis of Formula 7. The inputs A to D are inputted to a NAND G1 and an output therefrom is inputted to an inverter G2, and the inverter G2 outputs the second carry-out Co2.

The inputs A and B are inputted to an OR gate G3, the inputs C and D are inputted to an OR gate G4, and outputs from the OR gates G3 and G4 are inputted to a NAND gate G5. The gates G3 to G5 can be constructed as a compound gate.

The inputs A and B are inputted to an AND gate G7, the inputs C and D are inputted to an AND gate G8, and outputs from the AND gates G7 and G8 are inputted to a NOR gate G9. The gates G7 to G9 can be constructed as a compound gate.

The outputs from the NAND gate G5 and the NOR gate G9 are inputted to the NAND gate G6, and a NAND gate G6 outputs the first carry-out Co1.

The inputs A and B are inputted to an XOR gate G17, the inputs C and D are inputted to an XOR gate G18, and outputs from the XOR gates G17 and G18 are inputted to an XOR gate G19. The first and second carry-ins Ci1 and Ci2 are inputted to an XOR gate G20 and outputs from the XOR gates G19 and G20 are inputted to an XOR gate G21. The XOR gate G21 outputs the lower output SO.

The first and second carry-ins Ci1 and Ci2 are inputted to a NAND gate G10, and also inputted to a NOR gate G11 and an output therefrom is inputted to an inverter G12. An output from the NAND gate G10, together with the output from the XOR gate G19, is inputted to a NOR gate G13. An output from the inverter G12, together with the output from the XOR gate G19, is inputted to an AND gate G14. Outputs from the NOR gate G13 and the AND gate G14 are inputted to a NOR gate G15 and an output therefrom is inputted to an inverter G16. The gates G14 and G15 can be constructed as a compound gate. The inverter G16 outputs the upper output CO.

The first and second carry-outs Co1 and Co2, having the same weight, may take exchangeable values. If the four inputs A to D have two "1"s, the first and second carry-outs Co1 and Co2 may take "1" and "0" respectively, and if the four inputs A to D have three "1"s, the first and second carry-outs Co1 and Co2 may take, "0" and "1" respectively.

Adding this change to Table 4, the result is shown in Table 5.

TABLE 5

| A | B | C | D | SO | Co1 | Co2 | CO |
|---|---|---|---|---|---|---|---|
| 0 | 0 | 0 | 0 | Ci1 ^ Ci2 | 0 | 0 | Ci1 & Ci2 |
| 0 | 0 | 0 | 1 | ~(Ci1 ^ Ci2) | 0 | 0 | Ci1 \| Ci2 |
| 0 | 0 | 1 | 0 | ~(Ci1 ^ Ci2) | 0 | 0 | Ci1 \| Ci2 |
| 0 | 0 | 1 | 1 | Ci1 ^ Ci2 | 1 | 0 | Ci1 & Ci2 |
| 0 | 1 | 0 | 0 | ~(Ci1 ^ Ci2) | 0 | 0 | Ci1 \| Ci2 |
| 0 | 1 | 0 | 1 | Ci1 ^ Ci2 | 1 | 0 | Ci1 & Ci2 |
| 0 | 1 | 1 | 0 | Ci1 ^ Ci2 | 1 | 0 | Ci1 & Ci2 |
| 0 | 1 | 1 | 1 | ~(Ci1 ^ Ci2) | 0 | 1 | Ci1 \| Ci2 |
| 1 | 0 | 0 | 0 | ~(Ci1 ^ Ci2) | 0 | 0 | Ci1 \| Ci2 |
| 1 | 0 | 0 | 1 | Ci1 ^ Ci2 | 1 | 0 | Ci1 & Ci2 |
| 1 | 0 | 1 | 0 | Ci1 ^ Ci2 | 1 | 0 | Ci1 & Ci2 |
| 1 | 0 | 1 | 1 | ~(Ci1 ^ Ci2) | 0 | 1 | Ci1 \| Ci2 |
| 1 | 1 | 0 | 0 | Ci1 ^ Ci2 | 1 | 0 | Ci1 & Ci2 |
| 1 | 1 | 0 | 1 | ~(Ci1 ^ Ci2) | 0 | 1 | Ci1 \| Ci2 |
| 1 | 1 | 1 | 0 | ~(Ci1 ^ Ci2) | 0 | 1 | Ci1 \| Ci2 |
| 1 | 1 | 1 | 1 | Ci1 ^ Ci2 | 1 | 1 | Ci1 & Ci2 |

Table 5 shows the second example of the truth table of input-output relation that the extended 4-input 2-output adder 100 should satisfy. The truth table of Table 5 is expressed in Boolean expression as $$Co1 = (A\char`\^ B)\&(C\char`\^ D)|\sim(A\char`\^ B)\&C\&D|\sim(C\char`\^ D)\&A\&B$$

$$Co2 = A\&B\&(C|D)|C\&D\&(A|B)$$

$$SO = A\char`\^ B\char`\^ C\char`\^ D\char`\^ Ci1\char`\^ Ci2$$

$$CO = \sim(A\char`\^ B\char`\^ C\char`\^ D)\&(Ci1\&Ci2)|(A\char`\^ B\char`\^ C\char`\^ D)\&(Ci1|Ci2) \quad (8)$$

Figure 5:
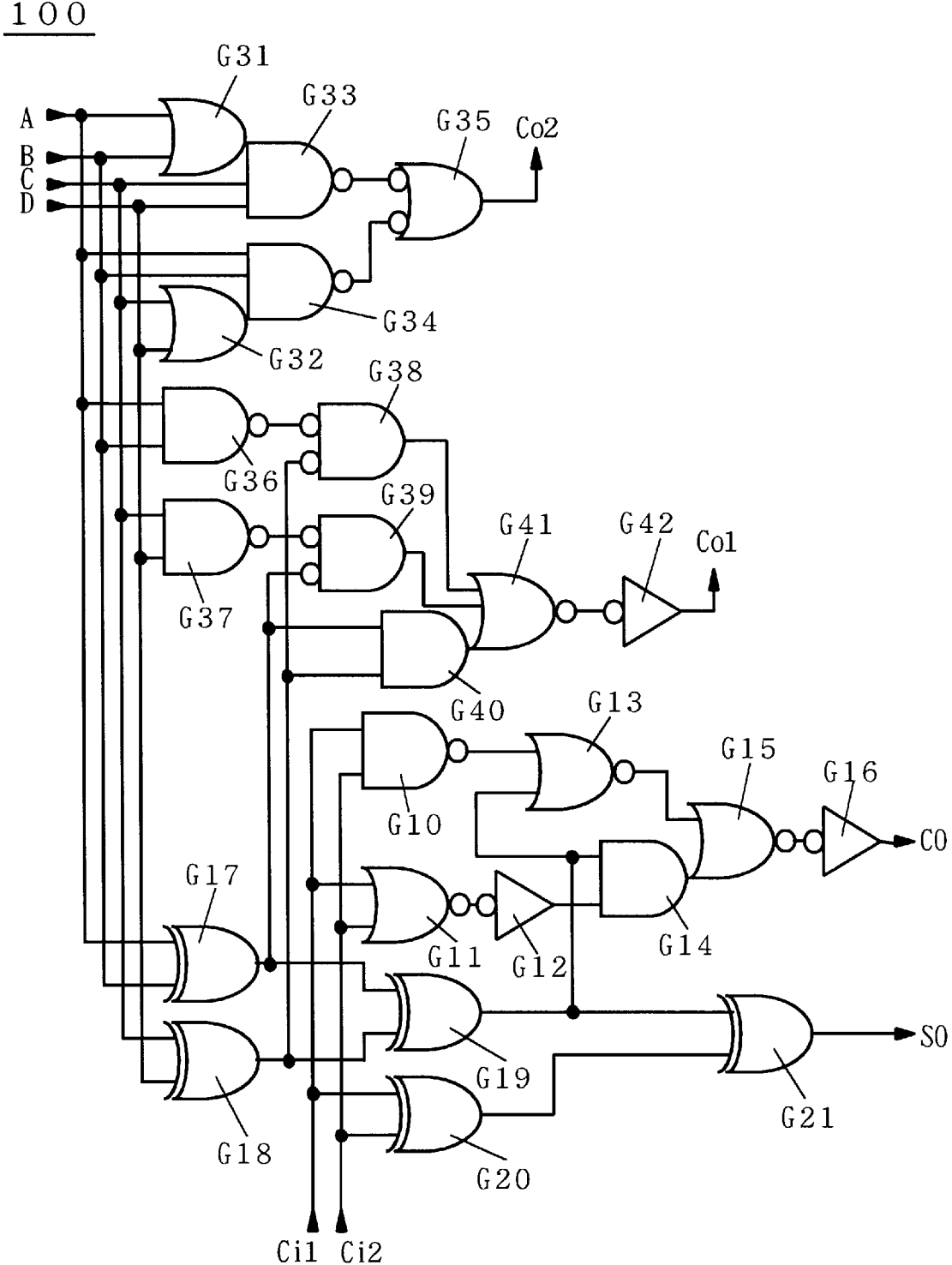
FIG. 5 is a circuit diagram of the second example of a configuration of an extended 4-input 2-output adder 100.

FIG. 5 is a circuit diagram of the second example of the configuration of the extended 4-input 2-output adder 100 on the basis of Formula 8. The configuration to obtain the lower output SO and the upper output CO by using the gates G17 to G21 is the same as that of FIG. 4.

The inputs A and B are inputted to an OR gate G31 and an output therefrom and the inputs C and D are inputted to an AND gate G33. The gates G31 and G33 can be constructed as a compound gate. The inputs C and D are inputted to an OR gate G32 and an output therefrom and the inputs A and B are inputted to a NAND gate G34. The gates G32 and G34 can be constructed as a compound gate. Outputs from the NAND gates G33 and G34 are inputted to a NAND gate G35 and the NAND gate G35 outputs the second carry-out Co2.

The inputs A and B are inputted to a NAND gate G36 and the inputs C and D are inputted to a NAND gate G37. An output from the NAND gate G36, together with the output from the XOR gate G18, is inputted to a NOR gate G38. An output from the NAND gate G37, together with the output from the XOR gate G17, is inputted to a NOR gate G39. Outputs from the XOR gates G17 and G18 are inputted to an AND gate G40. Outputs from the NOR gates G38 and G39 and the AND gate G40 are inputted to an NOR gate G41 and an output therefrom is inputted to an inverter G42, and the inverter G42 outputs the first carry-out Co1. The gates G40 and G41 can be constructed as a compound gate.

As can be seen from comparison between Tables 4 and 5, differences between these tables are found only in sections where the first and second carry-outs Co1 and Co2 are exchanged. In other words, there is no difference with respect to the lower output SO and the upper output CO. Both the lower output SO and the upper output CO are functions of logical product, logical sum and exclusive logical sum of the first and second carry-ins Ci1 and Ci2 and the first and second carry-ins Ci1 and Ci2 are commutative in these logical operation.

The following equations are true:

$$Co1 \& Co2 = A \& B \& C \& D \quad (9)$$

$$Co1 | Co2 = (A|B) \& (C|D) | (A \& B | C \& D)$$

$$Co1 \char`\^ Co2 = Co1 \& \sim Co2 | \sim Co1 \& Co2$$
$$= \sim(A \& B) \& C \& D | A \& B \&$$
$$\sim(C \& D) | (A \char`\^ B) \& (C \char`\^ D)$$

Thus, the configuration of the extended 4-input 2-output adder 100 has only to satisfy the following Boolean expression, not being limited to such configurations as shown in FIGS. 4 and 5. Specifically, the extended 4-input 2-output adders 100 of FIG. 3A may have different configurations.

$$Co1 \& Co2 = A \& B \& C \& D \quad (10)$$

$$Co1 | Co2 = (A|B) \& (C|D) | (A \& B | C \& D)$$

$$Co1 \char`\^ Co2 = \sim(A \& B) \& C \& D | A \& B \&$$
$$\sim(C \& D) | (A \char`\^ B) \& (C \char`\^ D)$$

$$SO = A \char`\^ B \char`\^ C \char`\^ D \char`\^ Ci1 \char`\^ Ci2$$

$$CO = \sim(A \char`\^ B \char`\^ C \char`\^ D) \& (Ci1 \& Ci2) | (A \char`\^ B \char`\^ C \char`\^ D) \&$$
$$(Ci1 | Ci2)$$

In the circuit of FIG. 4 or 5, the critical path of the extended 4-input 2-output adder 100 does not go through the gates G17 (or G18), G19 or G21. That is because the first and second carry-ins Ci1 and Ci2 are determined after the outputs from the XOR gates G17 and G18 are determined.

Since the first and second carry-ins Ci1 and Ci2 takes the first and second carry-outs Co1 and Co2 from the lower-next bit, respectively, it is needed to estimate the time required to determine the carry-outs Co1 and Co2. The number of gate-stages required to determine the first and second carry-outs Co1 and Co2 is two in the circuit of FIG. 4 and four in that of FIG. 5 (the circuit of FIG. 4 needs less gate-stages required to obtain the first and second carry-outs Co1 and Co2 than the circuit of FIG. 5). Considering that the delay of one stage of XOR is generally larger than that of one stage of other logical gate and corresponds to about two stages thereof, as discussed earlier, the delay time required to determine the first and second carry-outs Co1 and Co2 is less than that of two stages of XORs.

To obtain the lower output SO, the delay time of two stages of XOR gates, i.e., the gates G20 and G21, is further needed after the first and second carry-outs Co1 and Co2 are determined. After all, the delay time ranges from three stages of XORs to four stages of XORs. However, the extended 4-input 2-output adder 100 is delayed by less than one stage of XOR as compared with the 4-input 2-output adder 200.

As to addition blocks shown in FIGS. 1 and 2A to 2C, the addition is performed in the order of the first stage of the tree circuit (the extended 4-input 2-output addition block 1a, the 4-input 2-output addition blocks 2a to 2c), the second stage (the 4-input 2-output addition blocks 2d and 2e) and the third stage (the 4-input 2-output addition block 2f). Accordingly, the delay time from the determination of the first elements $pp_0$ to $pp_{15}$ and the second elements $pc_0$ to $pc_{15}$ of the partial products to the determination of the lower output $so_7$ and the upper output $co_7$ of the 4-input 2-output addition block 2f as the two eventual intermediate sums is $(3+\alpha)+2\times3=9+\alpha$ ($0<\alpha<1$) stages of XORs since the critical path goes through one stage of extended 4-input 2-output addition block and two stages of 4-input 2-output addition blocks.

In summary, the tree circuit of the first preferred embodiment needs the delay time of less than ten stages of XORs, thus ensuring higher-speed operation as compared with the background art. Moreover, it needs only seven addition blocks and accordingly can reduce the circuit scale. As discussed above, the first preferred embodiment is achieved only by replacing the background-art 4-input 2-output adders 200 by the extended 4-input 2-output adders 100 on a bit-by-bit basis. Furthermore, among thirty-five adders needed to form all of the addition blocks, only five adders have to be replaced.

Figure 18:
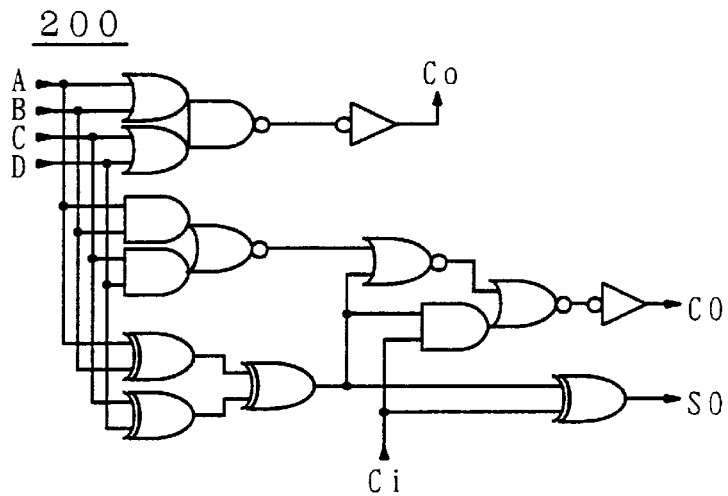
FIG. 18 is a circuit diagram of an example of the 4-input 2-output adder 200.

In comparison between the circuits of FIGS. 4 and 18, the increase in circuit scale due to replacement of the 4-input 2-output addition block 22a by the extended 4-input 2-output addition block 1a is negligible on the whole of the multiplier since the ratio of the extended 4-input 2-output adder 100 to the 4-input 2-output adder 200 in circuit scale is about 1.5 to 1.

Except the extended 4-input 2-output addition block 1a, the configuration of this preferred embodiment is achieved using the background art. Detailed discussion will be given referring to FIGS. 2A to 2C. The tenth to fortieth bits of the first element $pp_4$ <40:8> of the partial product $P_4$, all bits of the first element $pp_5$ <42:10> and the second element $pc_5$ of the partial product $P_5$, all bits of the first element $pp_6$ <44:12> and the second element $pc_6$ of the partial product $P_6$, the fourteenth to forty-fourth bits of the first element $pp_7$ <46:14> of the partial product $P_7$ are inputted to the 4-input 2-output addition block 2a, adjusting the bit positions.

The second element $pc_5$ of the partial product $P_5$ and the second element $pc_6$ of the partial product $P_6$ are dealt with as pseudo lower bits of the first element $pp_7$ of the partial product $P_7$.

The eighth and ninth bits of the first element $pp_4$ of the partial product $P_4$ are dealt with as pseudo lower bits of the upper output $co_2$ <45:11> of the 4-input 2-output addition block 2a and propagated to the 4-input 2-output addition block 2d since the 4-input 2-output addition block 2a does not cover their bit positions.

The second element $pc_4$ of the partial product $P_4$ is propagated to the 4-input 2-output addition block 2d since the 4-input 2-output addition block 2a does not cover its bit position.

The forty-fifth bit of the first element $pp_7$ of the partial product $P_7$ is dealt with as a pseudo upper bit of the lower output $so_2$ <44:10> of the 4-input 2-output addition block 2a and propagated to the 4-input 2-output addition block 2d since the 4-input 2-output addition block 2a does not cover its bit position. The forty-sixth bit of the first element $pp_7$ of the partial product $P_7$ is dealt with as a pseudo upper bit of the lower output $so_5$ <45:6> of the 4-input 2-output addition block 2d and propagated to the 4-input 2-output addition block 2f since neither the 4-input 2-output addition block 2a nor 2d covers its bit position.

The second element $pc_7$ of the partial product $P_7$ is not added in the extended 4-input 2-output addition block 2a and is propagated to the 4-input 2-output addition block 2f since four data already exit on its bit position.

The 4-input 2-output addition block 2f is located on the fourteenth bit and higher. Accordingly, the sixth to thirteenth bits of the lower output $so_5$ of the 4-input 2-output addition block 2d, along with the second to fifth bits of the lower output $so_1$ and the zeroth and first bits of the first element $pp_0$ which are dealt with as the pseudo lower bits thereof, are dealt with as pseudo lower bits of the lower output $so_7$ <62:14> of the 4-input 2-output addition block 2f to be finally added.

Similarly, the seventh to thirteenth bits of the upper output $co_5$ of the 4-input 2-output addition block 2d, along with the third to fifth bits of the upper output $co_1$ and the second element $pc_0$ which are dealt with as the pseudo lower bits thereof, are dealt with as pseudo lower bits of the upper output $co_7$ <63:15> of the 4-input 2-output addition block 2f to be finally added.

The eighteenth to forty-eighth bits of the first element $pp_8$ <48:16> of the partial product $P_8$, all bits of the first element $pp_9$ <50:18> and the second element $pc_9$ of the partial product $P_9$, all bits of the first element $pp_{10}$ <52:20> and the second element $pc_{10}$ of the partial product $P_{10}$, and the twenty-second to fifty-second bits of the first element $pp_{11}$ <54:22> of the partial product $P_{11}$ are inputted to the 4-input 2-output addition block 2b, adjusting the bit positions.

The second element $pc_9$ of the partial product $P_9$ and the second element $pc_{10}$ of the partial product $P_{10}$ are dealt with as pseudo lower bits of the first element $pp_{11}$ of the partial product $P_{11}$.

The sixteenth and seventeenth bits of the first element $pp_8$ of the partial product $P_8$ are dealt with as pseudo lower bits of the upper output $co_3$ <53:19> of the 4-input 2-output addition block 2b since the 4-input 2-output addition block 2b does not cover their bit positions.

The second element $pc_8$ of the partial product $P_8$ is propagated to the 4-input 2-output addition block 2f since 4-input 2-output addition block 2b does not cover its bit position.

The fifty-third and fifty-fourth bits of the first element $pp_{11}$ of the partial product $P_{11}$ are dealt with as pseudo upper bits of the lower output $so_3$ <52:18> of the 4-input 2-output addition block 2b and propagated to the 4-input 2-output addition block 2e since the 4-input 2-output addition block 2b does not cover their bit positions.

The second element $pc_{11}$ of the partial product $P_{11}$ is not added in the extended 4-input 2-output addition block 2b and is propagated to the 4-input 2-output addition block 2e since four data already exit on its bit position.

The 4-input 2-output addition block 2e is located on the twenty-second bit and higher. Accordingly, the eighteenth to twenty-first bits of the lower output $so_3$ of the 4-input 2-output addition block 2b are dealt with as pseudo lower bits of the lower output $so_6$ <61:22> of the 4-input 2-output addition block 2e and propagated to the 4-input 2-output addition block 2f.

Similarly, the nineteenth to twenty-first bits of the upper output $co_3$ of the 4-input 2-output addition block 2b, along with the sixteenth and seventeenth bits of the first element $pp_8$ of the partial product $P_8$ which are pseudo lower bits thereof, are dealt with as pseudo lower bits of the upper output $co_6$ <62:23> of the 4-input 2-output addition block 2e and propagated to the 4-input 2-output addition block 2f.

The twenty-sixth to fifty-sixth bits of the first $pp_{12}$ <56:24> of the partial product $P_{12}$, all bits of the first element $pp_{13}$ <58:26> and the second element $pc_{13}$ of the partial product $P_{13}$, all bits of the first element $pp_{14}$ <60:28> and the second element $pc_{14}$ of the partial product $P_{14}$, and the thirtieth to sixtieth bits of the first element $pp_{15}$ <62:30> of the partial product $P_{15}$ are inputted to the 4-input 2-output addition block 2c, adjusting the bit positions.

The second element $pc_{13}$ of the partial product $P_{13}$ and the second element $pc_{14}$ of the partial product $P_{14}$ are dealt with as pseudo lower bits of the first element $pp_{15}$ of the partial product $P_{15}$.

The twenty-fourth and twenty-fifth bits of the first element $pp_{12}$ of the partial product $P_{12}$ are dealt with as pseudo lower bits of the upper output $co_4$ <61:27> of the 4-input 2-output addition block 2c since the 4-input 2-output addition block 2c does not cover their bit positions.

The second element $pc_{12}$ of the partial product $P_{12}$ is propagated to the 4-input 2-output addition block 2e since the 4-input 2-output addition block 2c does not cover its bit position.

The sixty-first bit of the first element $pp_{15}$ of the partial product $P_{15}$ is dealt with as a pseudo upper bit of the lower output $so_4$ <60:26> of the 4-input 2-output addition block 2c and propagated to the 4-input 2-output addition block 2e since the 4-input 2-output addition block 2c does not cover its bit position. The sixty-second bit of the first element $pp_{15}$ of the partial product $P_{15}$ is dealt with as a pseudo upper bit of the lower output $so_6$ <61:22> of the 4-input 2-output addition block 2e and propagated to the 4-input 2-output addition block 2f since the 4-input 2-output addition block 2c does not cover its bit position.

The 4-input 2-output addition block 2f performs addition of all the bits of the upper output $co_6$ and the lower output $so_6$ of the 4-input 2-output addition block 2e, the fourteenth and higher bits of the upper output $co_5$ and the lower output $so_5$ of the 4-input 2-output addition block 2d, the twenty-first and lower bits of the upper output $co_3$ and the lower output $so_3$ of the 4-input 2-output addition block 2b and the second elements $pc_7$ and $pc_8$. In this addition, it is clear from the figure that the number of inputs is four or less on the same bit position.

Since the arithmetic operation is performed while adjusting the bit positions, only in terms of the delay time, the second element $pc_{15}$ may be inputted to any of the seven addition blocks only if it is inputted to the same bit position (the thirtieth bit). For example, the extended 4-input 2-output addition block 1a may be replaced by the 4-input 2-output addition block and the 4-input 2-output addition block 2a may be replaced by the extended 4-input 2-output addition block.

However, as mentioned above, it must be considered that the disadvantageous increase of the circuit scale is not negligible since the number of extended 4-input 2-output adders, i.e., bit width, of the extended 4-input 2-output addition block increases.

Therefore, the minimum value of the number of the extended 4-input 2-output adders (bit width) constituting the extended 4-input 2-output addition block depends on the bit position of the second element $pc_{15}$ (the thirtieth bit herein) (the first principle), the most significant bit position of one of the four input data having a plurality of bit width of which the most significant bit is the lowest ($pp_0$ herein) (the second principle) and the number of bits required for implementation of "one-addition technique" (two herein, which depends on the number of orders of the Booth algorithm, for complement to the first and second principles).

In other words, to achieve the first preferred embodiment with best area-efficiency, the highest one of the second elements $pc_j$ generated according to the secondary Booth algorithm and one of the first elements $pp_j$ of which the most significant bit is the lowest have only to be inputted to the same extended 4-input 2-output addition block.

The Second Preferred Embodiment

As is clear from Formula 10, the values of the first and second carry-outs Co1 and Co2 transmitted between the extended 4-input 2-output adders 100 may have no meaning of carry. The logical product, logical sum and exclusive logical sum (or inversion thereof) of the first and second carry-outs Co1 and Co2 have only to be transmitted between the extended 4-input 2-output adders 100.

In view of that, it is possible to simplify the configuration of the extended 4-input 2-output adder. Specifically, the pseudo first and second carry-outs Coa and Cob, instead of the first and second carry-outs Co1 and Co2, are used. These pseudo carry-outs Coa and Cob serve as the first and second pseudo carry-ins Cia and Cib of the higher-next 4-input 2-output adder. For example, when the first and second pseudo carry-outs Coa and Cob are determined as $$Coa = Co1 | Co2, \quad Cob = \sim(Co1 \& Co2) \tag{11}$$

the following Formula is true:

$$Coa \& Cob = Co1 \char`\^ Co2 \tag{12}$$

When Formula 10 is rewritten using the first and second pseudo carry-outs Coa and Cob and the first and second pseudo carry-ins Cia and Cib, $$Coa = (A|B) \& (C|D) | (A \& B | C \& D)$$

$$Cob = \sim(A \& B \& C \& D)$$

$$SO = A\char`\^B\char`\^C\char`\^D\char`\^(Cia \& Cib)$$

$$CO = \sim(A\char`\^B\char`\^C\char`\^D) \& \sim Cib | (A\char`\^B\char`\^C\char`\^D) \& Cia \tag{13}$$

Such pseudo carry suffices for transmission between the extended 4-input 2-output adders. A truth table of input-output relation that the extended 4-input 2-output adder should satisfy is shown in Table 6.

TABLE 6

| A | B | C | D | SO | Coa | Cob | CO |
|---|---|---|---|---|---|---|---|
| 0 | 0 | 0 | 0 | Cia & Cib | 0 | 1 | ~Cib |
| 0 | 0 | 0 | 1 | ~(Cia & Cib) | 0 | 1 | Cia |
| 0 | 0 | 1 | 0 | ~(Cia & Cib) | 0 | 1 | Cia |
| 0 | 0 | 1 | 1 | Cia & Cib | 1 | 1 | ~Cib |
| 0 | 1 | 0 | 0 | ~(Cia & Cib) | 0 | 1 | Cia |
| 0 | 1 | 0 | 1 | Cia & Cib | 1 | 1 | ~Cib |
| 0 | 1 | 1 | 0 | Cia & Cib | 1 | 1 | ~Cib |

TABLE 6-continued

| A | B | C | D | SO | Coa | Cob | CO |
|---|---|---|---|---|---|---|---|
| 0 | 1 | 1 | 1 | ¯(Cia & Cib) | 1 | 1 | Cia |
| 1 | 0 | 0 | 0 | ¯(Cia & Cib) | 0 | 1 | Cia |
| 1 | 0 | 0 | 1 | Cia & Cib | 1 | 1 | ¯Cib |
| 1 | 0 | 1 | 0 | Cia & Cib | 1 | 1 | ¯Cib |
| 1 | 0 | 1 | 1 | ¯(Cia & Cib) | 1 | 1 | Cia |
| 1 | 1 | 0 | 0 | Cia & Cib | 1 | 1 | ¯Cib |
| 1 | 1 | 0 | 1 | ¯(Cia & Cib) | 1 | 1 | Cia |
| 1 | 1 | 1 | 0 | ¯(Cia & Cib) | 1 | 1 | Cia |
| 1 | 1 | 1 | 1 | Cia & Cib | 1 | 0 | ¯Cib |

Figure 6:
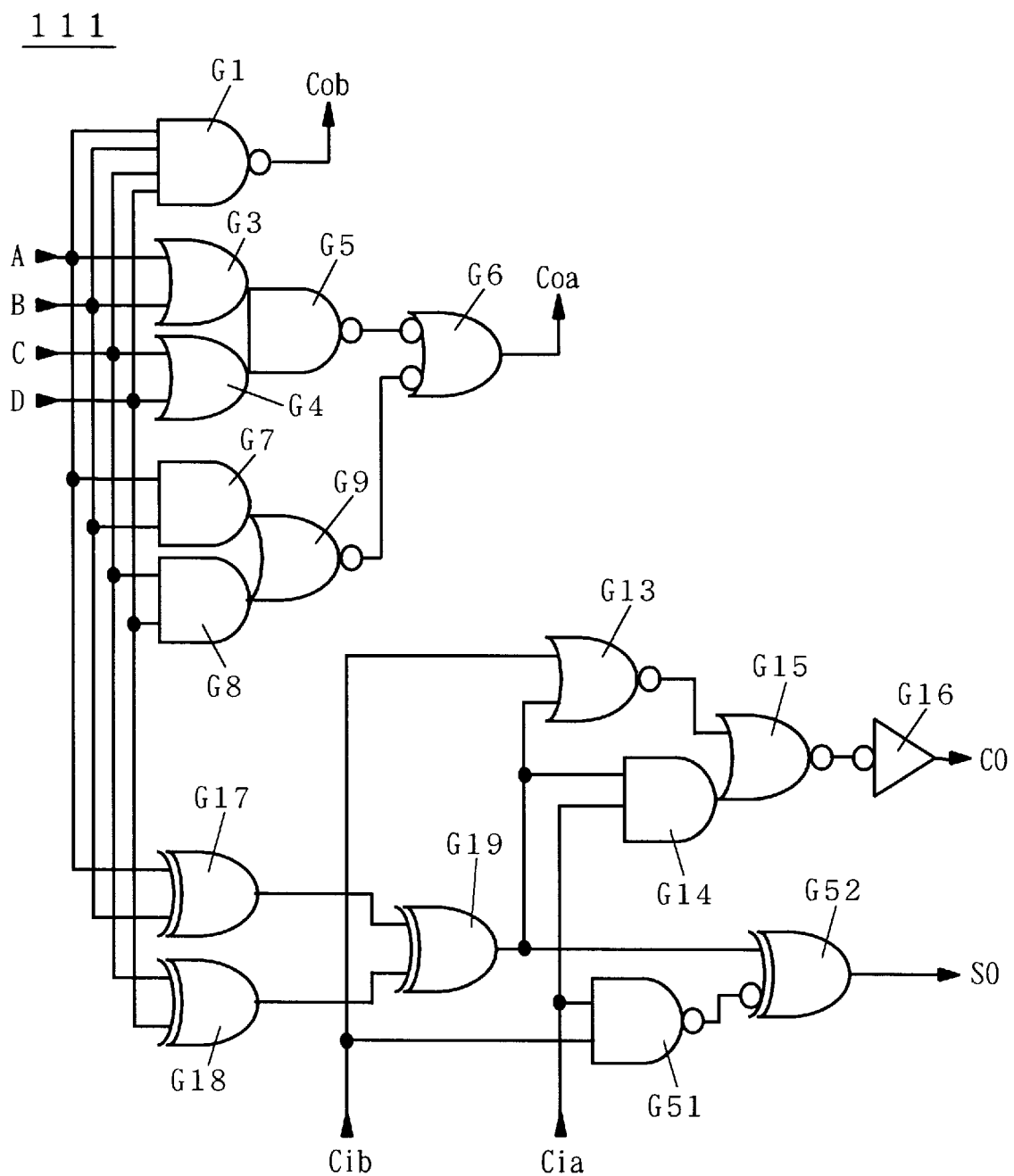
FIG. 6 is a circuit diagram illustrating a configuration of an extended 4-input 2-output adder 111.

FIG. 6 is a circuit diagram showing a configuration of the extended 4-input 2-output adder 111 which satisfies the relation of Table 6. As can be seen from comparison between Formulae 13 and 7, the first pseudo carry-out Coa is equivalent to the first carry-out Co1 and the second pseudo carry-out Cob is equivalent to an inversion of the second carry-out Co2. Therefore, the first and second pseudo carry-outs Coa and Cob can be provided by the adder having the construction of the gates G1 to G9 shown in FIG. 4 except the inverter G2.

Even if the extended 4-input 2-output adder 111 gives the pseudo carry, it outputs the upper output CO and the lower output SO. The inputs A and B are inputted to the XOR gate G17 and the inputs C and D are inputted to the XOR gate G18. The outputs from the XOR gates G17 and G18 are inputted to the XOR gate G19. The first and second pseudo carry-ins Cia and Cib are inputted to a NAND gate G51.

An output from the NAND gate G51 and the output from the XOR gate G19 are inputted to an XNOR gate G52. The XNOR gate G52 outputs the lower output SO.

The second pseudo carry-in Cib and the output of the XOR gate G19 are inputted to the NOR gate G13. The first pseudo carry-in Cia and the output from the XOR gate G19 are inputted to the AND gate G14. The outputs from the NOR gate G13 and the AND gate G14 are inputted to the NOR gate G15 and the output therefrom is inputted to the inverter G16. The gates G14 and G15 can be constructed as a compound gate. The inverter G16 outputs the upper output CO.

With the above configuration, the extended 4-input 2-output adder 111 has the gates less than the extended 4-input 2-output adder 100 of FIG. 4 by four, and therefore is more simplified.

However, when only the extended 4-input 2-output adders 111 are serially connected, the highest one of the second elements $pc_j$ ($pc_{15}$ in FIGS. 1 and 2A to 2C) and the carry-out Co from the regular 4-input 2-output adder 200 located lower next to the highest one of the second elements $pc_j$ (the twenty-ninth bit in FIGS. 1 and 2A to 2C) can not be properly processed. Conversely, the first and second pseudo carry-outs Coa and Cob of the extended 4-input 2-output adder 111 can not be used as the carry-in Ci or the input D of the regular 4-input 2-output adder 200.

Accordingly, another types of extended 4-input 2-output adders are needed on the high and low ends of serial connection of the extended 4-input 2-output adders 111 to adjust them to the regular 4-input 2-output adders 200.

Figure 7:
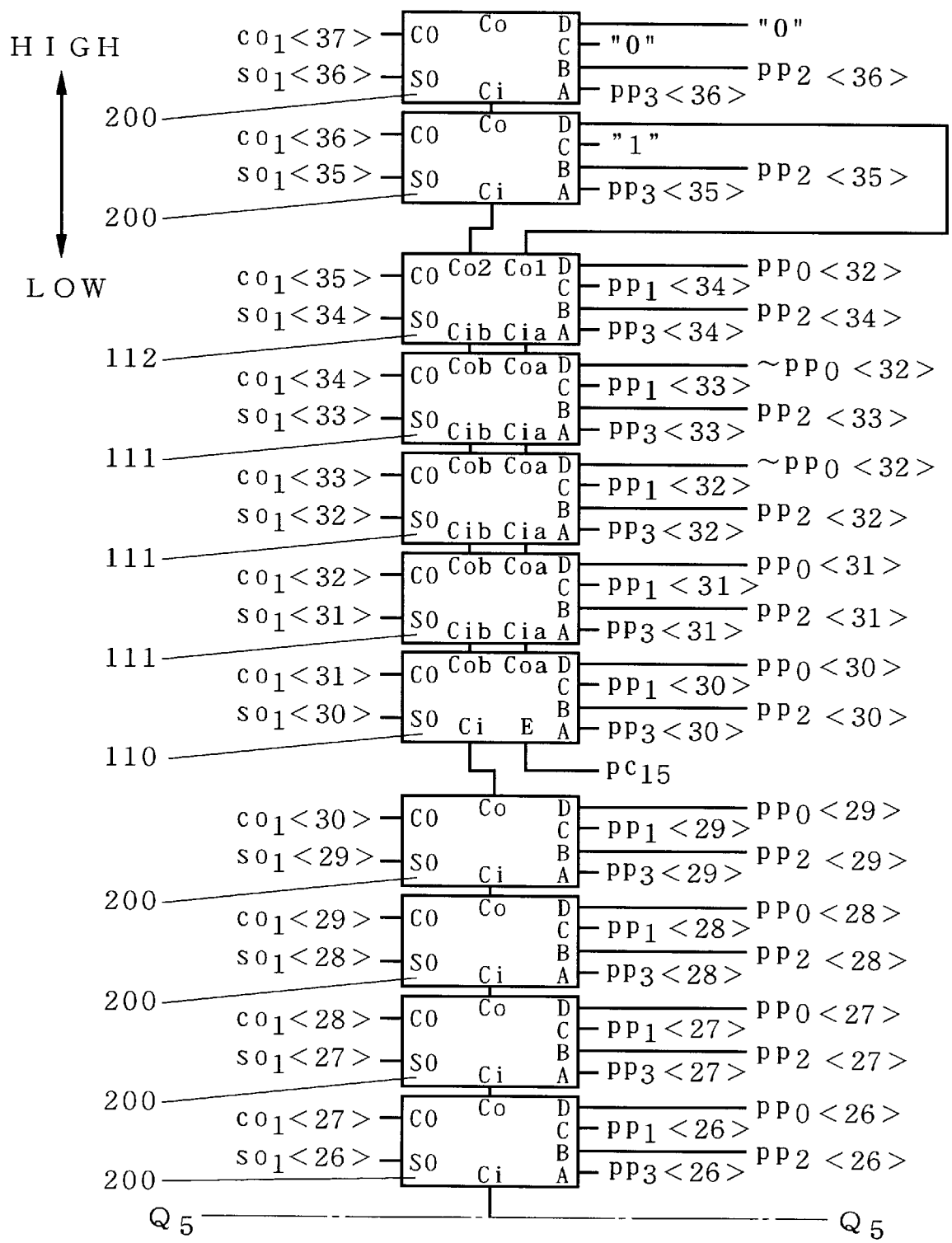

FIG. 7 is a block diagram showing part of the configuration of the extended 4-input 2-output addition block 1a, corresponding to FIG. 3A. That is, FIG. 7 is continuous with FIG. 3B at a virtual line Q5—Q5. FIG. 7 shows the configuration of the extended 4-input 2-output addition block 1a cooperatively with FIGS. 3B and 3C. In other words, a tree circuit of the second preferred embodiment have the same configuration as that of FIG. 1, and the extended 4-input 2-output addition block 1a of the second preferred embodiment is achieved by replacing the configuration of FIG. 3A by that of FIG. 7.

FIG. 7 shows the configuration where the extended 4-input 2-output adders 100 of FIG. 3A are replaced by extended 4-input 2-output adders 110 to 112. In more detail, the extended 4-input 2-output adder 110 is located on the thirtieth bit, the extended 4-input 2-output adders 111 are located on the thirty-first to thirty-third bits and the extended 4-input 2-output adder 112 is located on the thirty-fourth bit, instead of the extended 4-input 2-output adders 100.

The second element $pc_{15}$ is inputted to an input E of the extended 4-input 2-output adder 110 and the carry-out Co of the 4-input 2-output adder 200 on the twenty-ninth bit is inputted to the 4-input 2-output adder 110 as the carry-in Ci.

On the thirty-fifth bit, the two first elements $pp_2$ and $pp_3$ of the partial product are located and further "1" is located according to the "one-addition technique", and the input D of the 4-input 2-output adder 200 on this bit position is available. Then, the first carry-out Co1 of the extended 4-input 2-output adder 112 is inputted to the input D of the 4-input 2-output adder 200 and the second carry-out Co2 of the extended 4-input 2-output adder 112 is inputted to the carry-in Ci of the 4-input 2-output adder 200.

Naturally, the carry-out Co may be inputted to the input E of the extended 4-input 2-output adder 110 and the second element $pc_{15}$ may be inputted to the carry-in Ci. The second carry-out Co2 of the extended 4-input 2-output adder 112 may be inputted to the input D of the 4-input 2-output adder 200 on the thirty-fifth bit and the first carry-out Co1 of the extended 4-input 2-output adder 112 may be inputted to the carry-in Ci of the 4-input 2-output adder 200 on the thirty-fifth bit. Connections of the extended 4-input 2-output adders 110 to 112 can not be exchanged.

To achieve the same function as the extended 4-input 2-output adders 100 of FIG. 3A, in the extended 4-input 2-output adders 110 to 112 arranged as above, the extended 4-input 2-output adder 110 has to generate the first and second pseudo carry-outs Coa and Cob from the inputs A to D, the carry-in Ci and the input E, and the extended 4-input 2-output adder 112 has to generate the carry-out Co1 and Co2 from the inputs A to D and the first and second pseudo carry-ins Cia and Cib.

Figure 8:
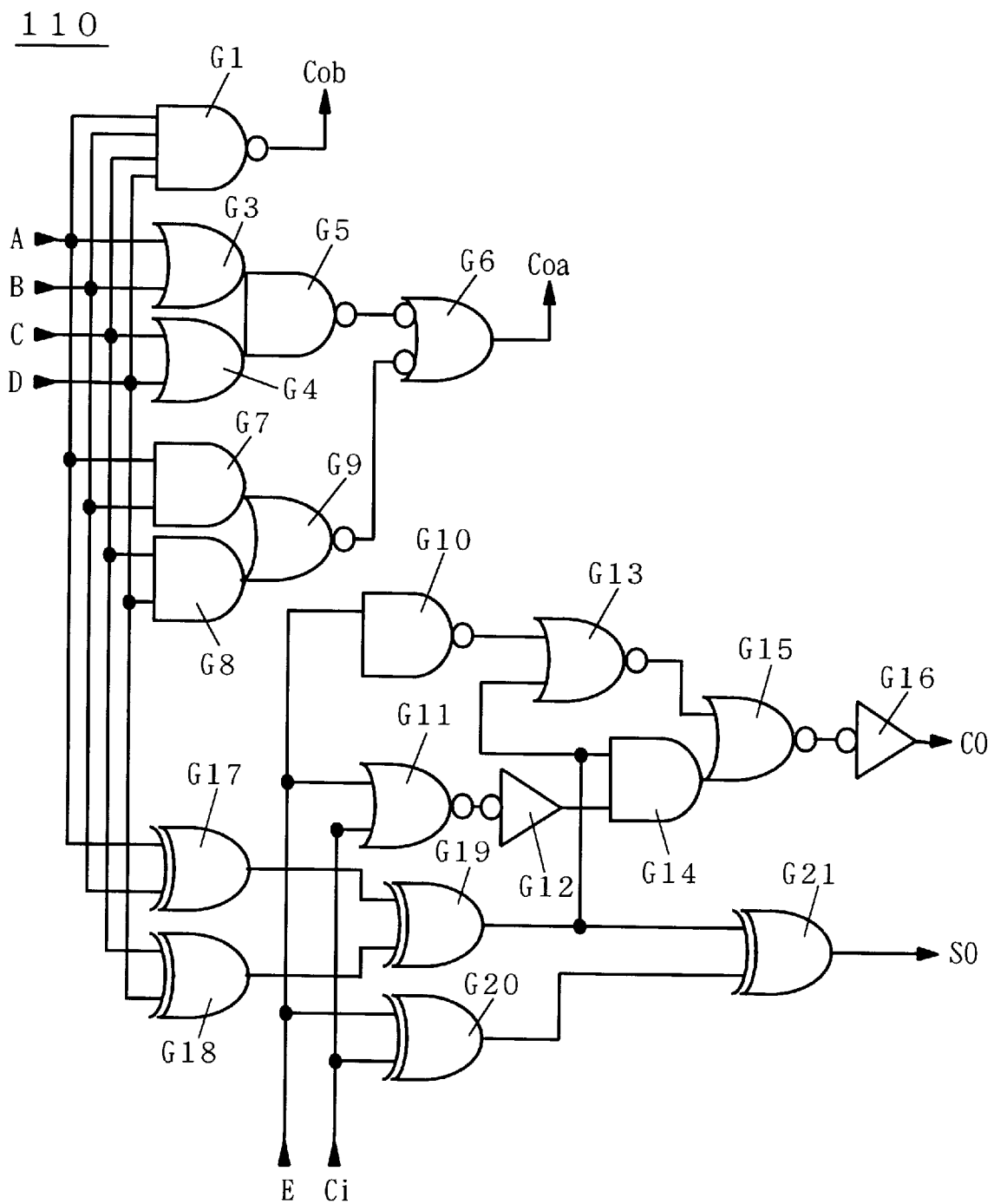
FIG. 8 is a circuit diagram illustrating a configuration of an extended 4-input 2-output adder 110.

Table 7 is a truth table of the function of the extended 4-input 2-output adder 110 and Formula 14 is Boolean expression satisfying Table 7. FIG. 8 is a circuit diagram illustrating a configuration of the extended 4-input 2-output adder 110 which satisfies Formula 14.

TABLE 7

| A | B | C | D | SO | Coa | Cob | CO |
|---|---|---|---|---|---|---|---|
| 0 | 0 | 0 | 0 | E ^ Ci | 0 | 1 | E & Ci |
| 0 | 0 | 0 | 1 | ¯(E ^ Ci) | 0 | 1 | E \| Ci |
| 0 | 0 | 1 | 0 | ¯(E ^ Ci) | 0 | 1 | E \| Ci |
| 0 | 0 | 1 | 1 | E ^ Ci | 1 | 1 | E & Ci |
| 0 | 1 | 0 | 0 | ¯(E ^ Ci) | 0 | 1 | E \| Ci |
| 0 | 1 | 0 | 1 | E ^ Ci | 1 | 1 | E & Ci |
| 0 | 1 | 1 | 0 | E ^ Ci | 1 | 1 | E & Ci |
| 0 | 1 | 1 | 1 | ¯(E ^ Ci) | 1 | 1 | E \| Ci |
| 1 | 0 | 0 | 0 | ¯(E ^ Ci) | 0 | 1 | E \| Ci |
| 1 | 0 | 0 | 1 | E ^ Ci | 1 | 1 | E & Ci |
| 1 | 0 | 1 | 0 | E ^ Ci | 1 | 1 | E & Ci |
| 1 | 0 | 1 | 1 | ¯(E ^ Ci) | 1 | 1 | E \| Ci |
| 1 | 1 | 0 | 0 | E ^ Ci | 1 | 1 | E & Ci |

TABLE 7-continued

| A | B | C | D | SO | Coa | Cob | CO |
|---|---|---|---|---|---|---|---|
| 1 | 1 | 0 | 1 | ~(E ^ Ci) | 1 | 1 | E \| Ci |
| 1 | 1 | 1 | 0 | ~(E ^ Ci) | 1 | 1 | E \| Ci |
| 1 | 1 | 1 | 1 | E ^ Ci | 1 | 0 | E & Ci |

$Coa=(A|B)\&(C|D)|(A\&B|C\&D)$ $Cob=(A\&B\&C\&D)$ $SO=A\char`\^B\char`\^C\char`\^D\char`\^E\char`\^Ci$ $CO=\sim(A\char`\^B\char`\^C\char`\^D)\&(E\&Ci)|(A\char`\^B\char`\^C\char`\^D)\&(E|Ci)$ (14)

The first and second pseudo carry-outs Coa and Cob can be provided by using the construction of the gates G1 to G9 of FIG. 4 except the inverter G2, as mentioned above. Furthermore, the input E and the carry-in Ci have the same meaning as the first and second carry-ins Ci1 and Ci2 of the first preferred embodiment. Accordingly, the upper output CO and the lower output SO can be provided by the gates GIO to G21 of FIG. 4. Therefore, the extended 4-input 2-output adder 110 can be constituted of gates less than those in the extended-input 2-output adder 100.

Figure 9:
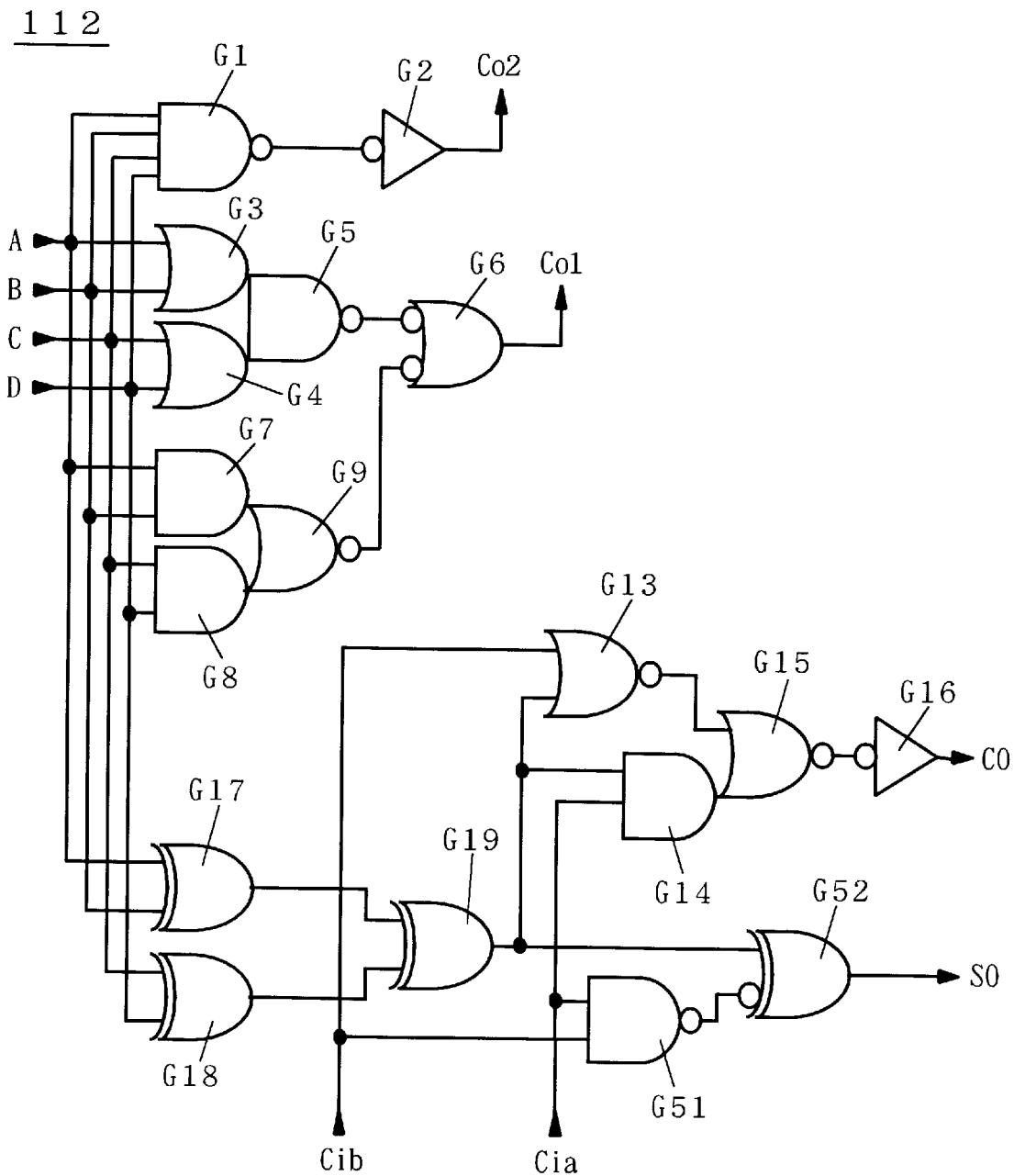
FIG. 9 is a circuit diagram illustrating a configuration of an extended 4-input 2-output adder 112.

Table 8 is a truth table of the function of the extended 4-input 2-output adder 112 and Formula 15 is Boolean expression satisfying Table 8. FIG. 9 is a circuit diagram illustrating a configuration of the extended 4-input 2-output adder 112 which satisfies Formula 15.

TABLE 8

| A | B | C | D | SO | Co1 | Co2 | CO |
|---|---|---|---|---|---|---|---|
| 0 | 0 | 0 | 0 | Cia & Cib | 0 | 0 | ~Cib |
| 0 | 0 | 0 | 1 | ~(Cia & Cib) | 0 | 0 | Cia |
| 0 | 0 | 1 | 0 | ~(Cia & Cib) | 0 | 0 | Cia |
| 0 | 0 | 1 | 1 | Cia & Cib | 1 | 0 | ~Cib |
| 0 | 1 | 0 | 0 | ~(Cia & Cib) | 0 | 0 | Cia |
| 0 | 1 | 0 | 1 | Cia & Cib | 1 | 0 | ~Cib |
| 0 | 1 | 1 | 0 | Cia & Cib | 1 | 0 | ~Cib |
| 0 | 1 | 1 | 1 | ~(Cia & Cib) | 1 | 0 | Cia |
| 1 | 0 | 0 | 0 | ~(Cia & Cib) | 0 | 0 | Cia |
| 1 | 0 | 0 | 1 | Cia & Cib | 1 | 0 | ~Cib |
| 1 | 0 | 1 | 0 | Cia & Cib | 1 | 0 | ~Cib |
| 1 | 0 | 1 | 1 | ~(Cia & Cib) | 1 | 0 | Cia |
| 1 | 1 | 0 | 0 | Cia & Cib | 1 | 0 | ~Cib |
| 1 | 1 | 0 | 1 | ~(Cia & Cib) | 1 | 0 | Cia |
| 1 | 1 | 1 | 0 | ~(Cia & Cib) | 1 | 0 | Cia |
| 1 | 1 | 1 | 1 | Cia & Cib | 1 | 1 | ~Cib |

$Co1=(A|B)\&(C|D)|(A\&B|C\&D)$ $Co2=(A\&B\&C\&D)$ $SO=A\char`\^B\char`\^C\char`\^D\char`\^(Cia\&Cib)$ $CO=\sim(A\char`\^B\char`\^C\char`\^D)\&\sim Cib|(A\char`\^B\char`\^C\char`\^D)\&Cia$ (15)

The extended 4-input 2-output adder 112, which has to output the first and second carry-outs Co1 and Co2, needs the gates G1 to G9 connected in the same manner as shown in FIG. 4. The upper output CO and the lower output SO can be provided by the gates G13 to G19 and G41 and G42 like in the extended 4-input 2-output adder 111. Therefore, the extended 4-input 2-output adder 112 can be constituted of gates less than those in the extended-input 2-output adder 100.

Thus, in the second preferred embodiment, the circuit scale is reduced by optimizing the logic for propagation between the extended 4-input 2-output adders, as discussed above, and the delay time is also reduced as compared with the first preferred embodiment.

As can be seen from FIGS. 6, 8 and 9 as to one of the extended 4-input 2-output adders 110 to 112 of the second preferred embodiment, the delay time from the determination of data values of the inputs A to D in the lower-next extended 4-input 2-output adder to the determination of the lower output SO of that extended 4-input 2-output adder can be reduced as compared with the extended 4-input 2-output adder 100 in the first preferred embodiment. In contrast to the first preferred embodiment which needs the XOR gate G20, the second preferred embodiment has only to include the NAND gate G51 of which the delay time is shorter than that of the XOR gate. Therefore, it is estimated that the delay time in the extended 4-input 2-output addition block 1$a$ of the second preferred embodiment is approximately three stages of XORs.

In the tree circuit constructed using the configuration of the second preferred embodiment, the addition is performed in the order of first stage of the tree circuit (the extended 4-input 2-output addition block 1$a$, the 4-input 2-output addition blocks 2$a$ to 2$c$), the second stage (the 4-input 2-output addition blocks 2$d$ and 2$e$) and the third stage (the 4-input 2-output addition block 2$f$). Accordingly, the delay time from the determination of the first elements $pp_0$ to $pp_{15}$ and the second elements $pc_0$ to $pc_{15}$ of the partial product to the determination of the lower output $so_7$ and the upper output $co_7$ of the 4-input 2-output addition block 2$f$ as the two eventual intermediate sums is 3+2×3=9 stages of XORs since the critical path goes through one stage of extended 4-input 2-output addition block and two stages of 4-input 2-output addition blocks. That is shorter than the delay time of the first preferred embodiment, i.e., (9+α) stages of XORs (0<α<1).

The Third Preferred Embodiment

Figure 10:
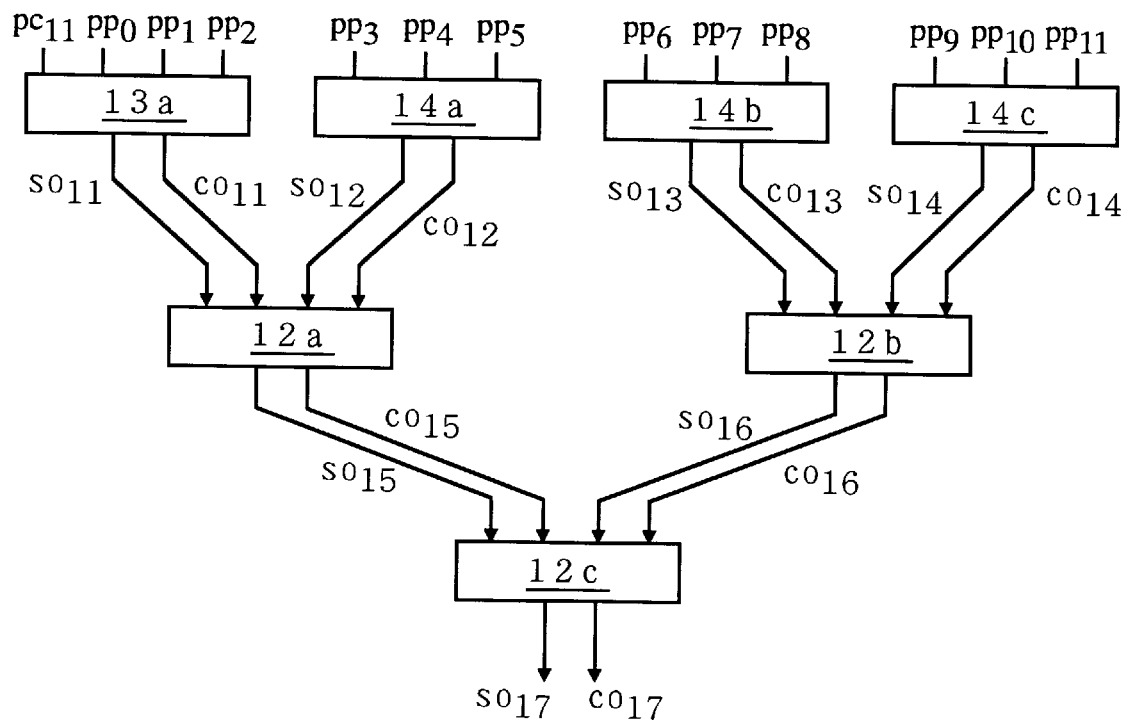
FIG. 10 is a block diagram showing a third preferred embodiment of the present invention.

FIG. 10 is a block diagram showing part of a configuration of a multiplier in accordance with the third preferred embodiment of the present invention. Both multiplier and multiplicand are 24-bit signed numbers in the two's complement representation and twelve partial products $P_0$ to $P_{11}$ are obtained according to the secondary Booth algorithm. This figure does not show a function to generate these partial products, but schematically shows a tree circuit which compresses the intermediate sums to eventually generate two eventual intermediate sums in addition of the partial products. The partial product $P_j$ depends on the first element $pp_j$ of 25-bit width, the second element $pc_j$ of 1-bit width and 2$j$ representing the least significant bit position, on the basis of Formula 5 as discussed in the background art.

The tree circuit of the third preferred embodiment is constituted of a circuit block 13$a$ for parallelly adding three input data of plural-number-bit width and one input data of 1-bit width (the circuit block will be referred to as "extended 3-input 2-output addition block" hereinafter), 3-input 2-output addition blocks 14$a$ to 14$c$ and 4-input 2-output addition blocks 12$a$ to 12$c$.

The extended 3-input 2-output addition block 13$a$ receives the second element $pc_{11}$ of the partial product and the first elements $pp_0$ to $pp_2$ of the partial product and outputs the upper output $co_{11}$ and lower output $so_{11}$ as intermediate sums. The 3-input 2-output addition block 14$a$ receives the first elements $pp_3$ to $pp_5$ of the partial product and outputs the upper output $co_{12}$ and lower output $so_{12}$ as intermediate sums. The 3-input 2-output addition block 14$b$ receives the first elements $pp_6$ to $pp_8$ of the partial product and outputs the upper output $co_{13}$ and lower output $so_{13}$ as intermediate sums. The 3-input 2-output addition block 14c receives the first elements $pp_9$ to $pp_{11}$ of the partial product and outputs the upper output $co_{14}$ and lower output $so_{14}$ as intermediate sums.

The 4-input 2-output addition block 12a receives the upper outputs $co_{11}$ and $co_{12}$ and lower outputs $so_{11}$ and $so_{12}$ and outputs the upper output $co_{15}$ and lower output $so_{15}$ as intermediate sums. The 4-input 2-output addition block 12b receives the upper outputs $co_{13}$ and $co_{14}$ and lower outputs $so_{13}$ and $so_{14}$ and outputs the upper output $co_{16}$ and lower output $so_{16}$ as intermediate sums. The 4-input 2-output addition block 12c receives the upper outputs $co_{15}$ and $co_{16}$ and lower outputs $so_{15}$ and $so_{16}$ and outputs the upper output $co_{17}$ and lower output $so_{17}$ as intermediate sums. The lower output $so_{17}$ and the upper output $co_{17}$ are finally added by the final addition block (not shown) to provide the multiplication result.

Figure 11A:
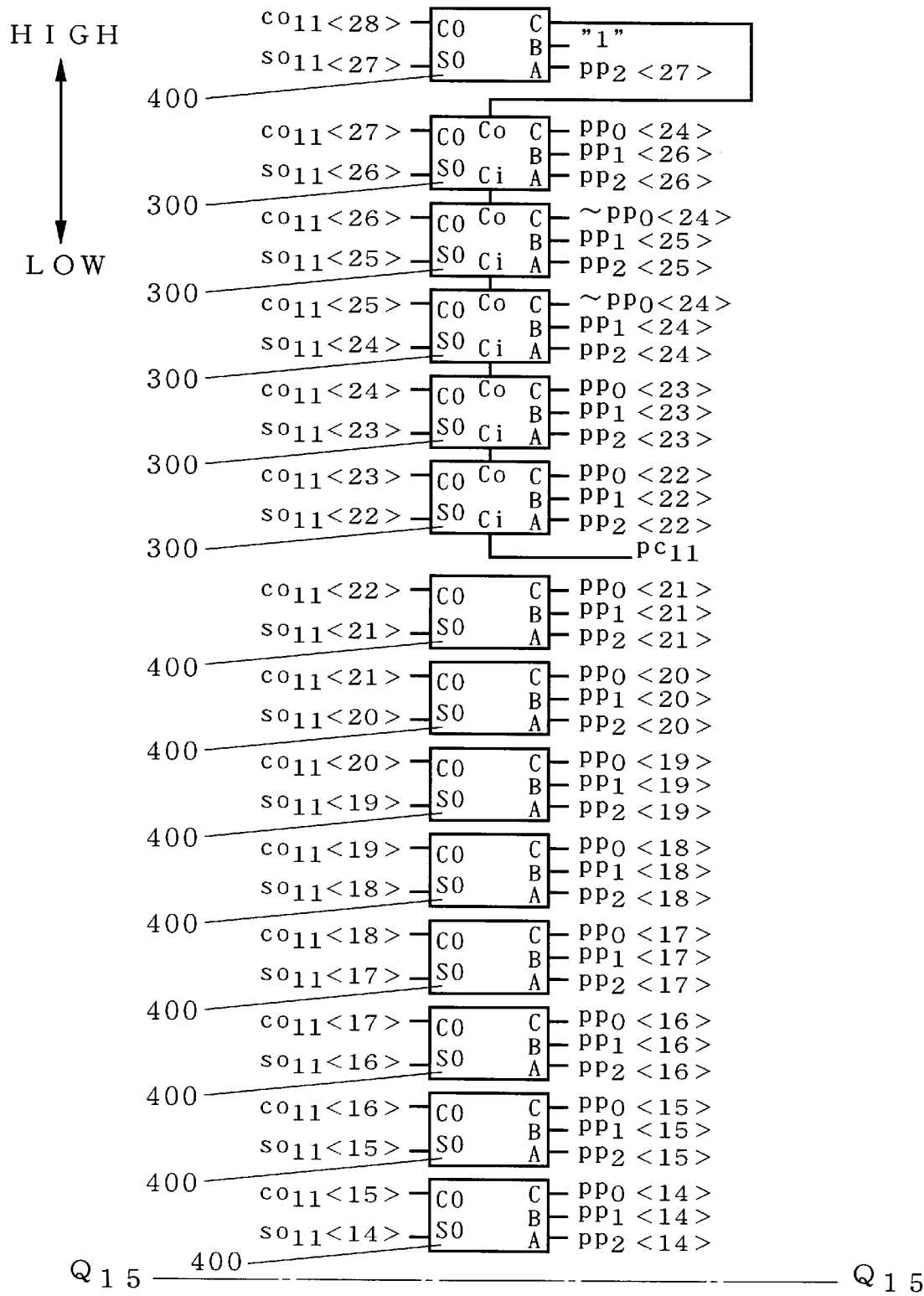
Figure 11B:
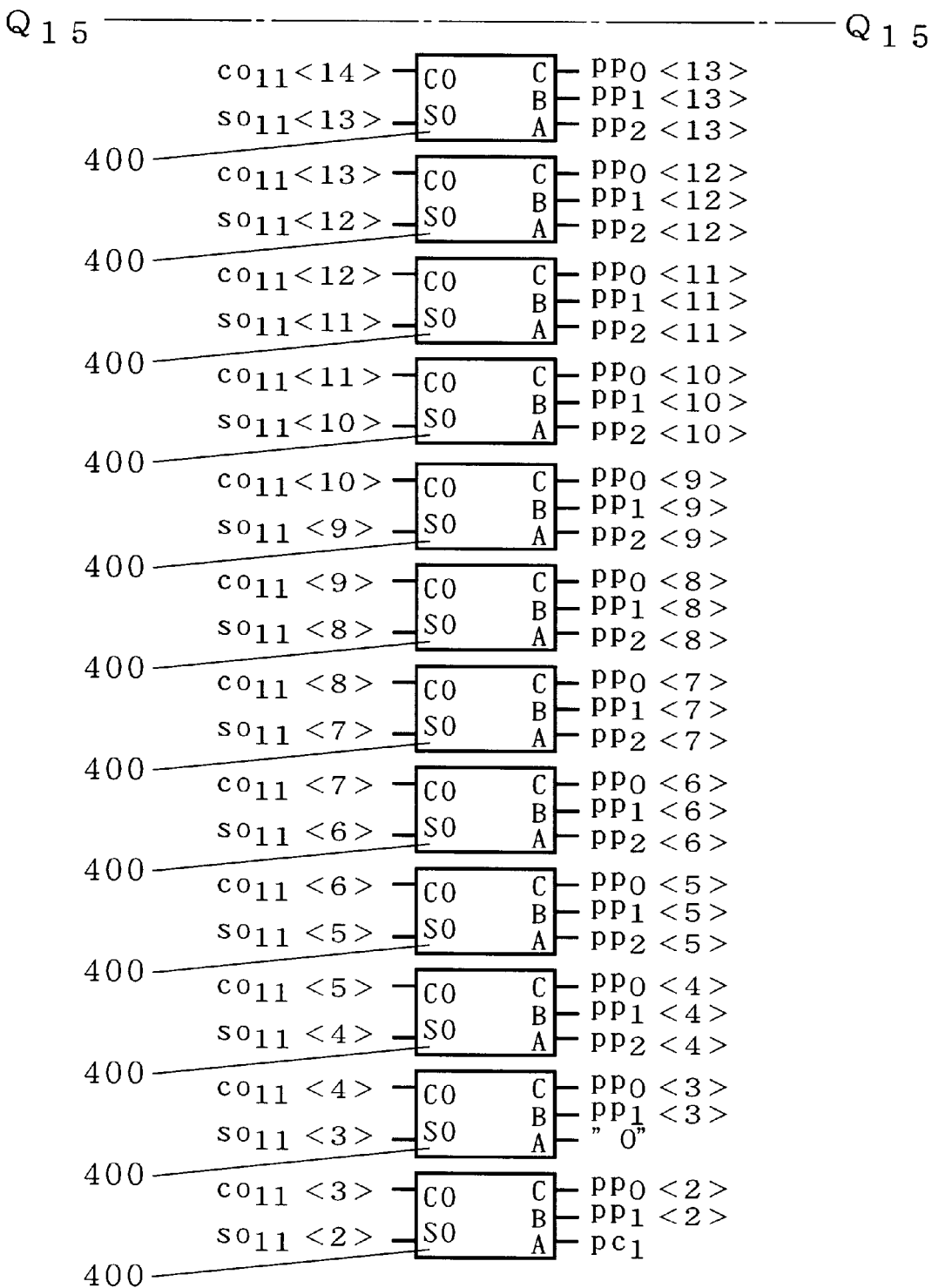

FIGS. 11A and 11B are block diagrams cooperatively showing a configuration of the extended 3-input 2-output addition block 13a. FIG. 11A is continuous with FIG. 11B at a virtual line Q15—Q15.

The extended 3-input 2-output addition block 13a, which performs parallel addition of 26-bit data, has a configuration where five extended 3-input 2-output adders 300 each for one bit are located on the twenty-second to twenty-sixth bits, twenty 3-input 2-output adders 400 each for one bit are located second to twenty-first bits and a 3-input 2-output adder 400 each for one bit is located on the twenty-seventh bits.

The sum of the three 1-bit inputs A, B and C is at most "3" in decimal notation and it is representable using two 1-bit outputs SO and CO. Therefore, in the twenty-first bit and lower, no carry is propagated between bits and no connection is needed between the 3-input 2-output adders 400.

The second element $pc_{11}$ of the partial product $P_{11}$ is inputted to the carry-in Ci of the extended 3-input 2-output adder 300 on the twenty-second bit. The carry-in Ci is regarded as a parity of the three first elements $pp_0$ <22>, $pp_1$ <22> and $pp_2$ <22> in weight of the twenty-second bit position, complying with the first principle.

Performing the "one-addition technique" as complement to the first and second principles, a logic inversion of the first element $pp_0$ <24> is inputted to the input C of the extended 3-input 2-output adders 300 on the twenty-fourth and twenty-fifth bits and the first element $pp_0$ <24> is inputted to the input C of the extended 3-input 2-output adder 300 on the twenty-sixth bit. Therefore, the 3-input 2-output adders 300 each for one bit are needed up to the twenty-sixth bit. In each of the twenty-second to twenty-sixth bits, the carry-out Co of the extended 3-input 2-output adder 300 is inputted to the higher-next adder as the carry-in Ci.

In the twenty-seventh bit, since the partial products are compressed, the first element $pp_2$ <27> and "1" for performing the "one-addition technique" are inputted to the inputs A and B, and further, the carry-out Co of the extended 3-input 2-output adder 300 on the twenty-sixth bit is inputted to the input C.

Now, the above extended 3-input 2-output adder 300 will be discussed. The extended 3-input 2-output adder 300 receives four 1-bit data and outputs the lower output SO1 for its bit position and two outputs for the higher-next bit, i.e., the carry-out Co and the upper output CO.

Accordingly, the following expression is true:

$$A+B+C+Ci=2(Co+CO)+SO \quad (16)$$

On the other hand, the lower output SO depends on whether the output from the extended 3-input 2-output adder 300 is even or odd number in decimal notation, and in other words, depends on whether the number of "1"s in the three inputs A to C and the carry-in Ci is even or odd number. A truth table that the extended 3-input 2-output adder 300 should satisfy is shown in Table 9.

TABLE 9

| A | B | C | SO | (Co, CO) |
|---|---|---|----|----------|
| 0 | 0 | 0 | Ci | (0, 0) |
| 0 | 0 | 1 | ~Ci | (0, Ci) |
| 0 | 1 | 0 | ~Ci | (0, Ci) |
| 0 | 1 | 1 | Ci | (1, 0) or (0, 1) |
| 1 | 0 | 0 | ~Ci | (0, Ci) |
| 1 | 0 | 1 | Ci | (1, 0) or (0, 1) |
| 1 | 1 | 0 | Ci | (1, 0) or (0, 1) |
| 1 | 1 | 1 | ~Ci | (1, Ci) |

When the three inputs A, B and C have two "1"s, either the carry-out Co or the upper output CO has to be "1" and the other has to be "0", and hence $2^3=8$ functions are shown. From the truth table in Table 9, the logic of the lower output SO is given using Boolean expression as $$SO = A\char`\^B\char`\^C\char`\^Ci \quad (17)$$

Table 10 is a truth table illustrating one of the functions that the extended 3-input 2-output adder 300 should satisfy.

TABLE 10

| A | B | C | SO | Co | CO |
|---|---|---|----|----|----|
| 0 | 0 | 0 | Ci | 0 | 0 |
| 0 | 0 | 1 | ~Ci | 0 | Ci |
| 0 | 1 | 0 | ~Ci | 0 | Ci |
| 0 | 1 | 1 | Ci | 1 | 0 |
| 1 | 0 | 0 | ~Ci | 0 | Ci |
| 1 | 0 | 1 | Ci | 1 | 0 |
| 1 | 1 | 0 | Ci | 1 | 0 |
| 1 | 1 | 1 | ~Ci | 1 | Ci |

The truth table is given using Boolean expression as $$Co = A\&B | B\&C | C\&A$$

$$CO = (A\char`\^B\char`\^C)\&Ci$$

$$SO = A\char`\^B\char`\^C\char`\^Ci \quad (18)$$

Figure 12:
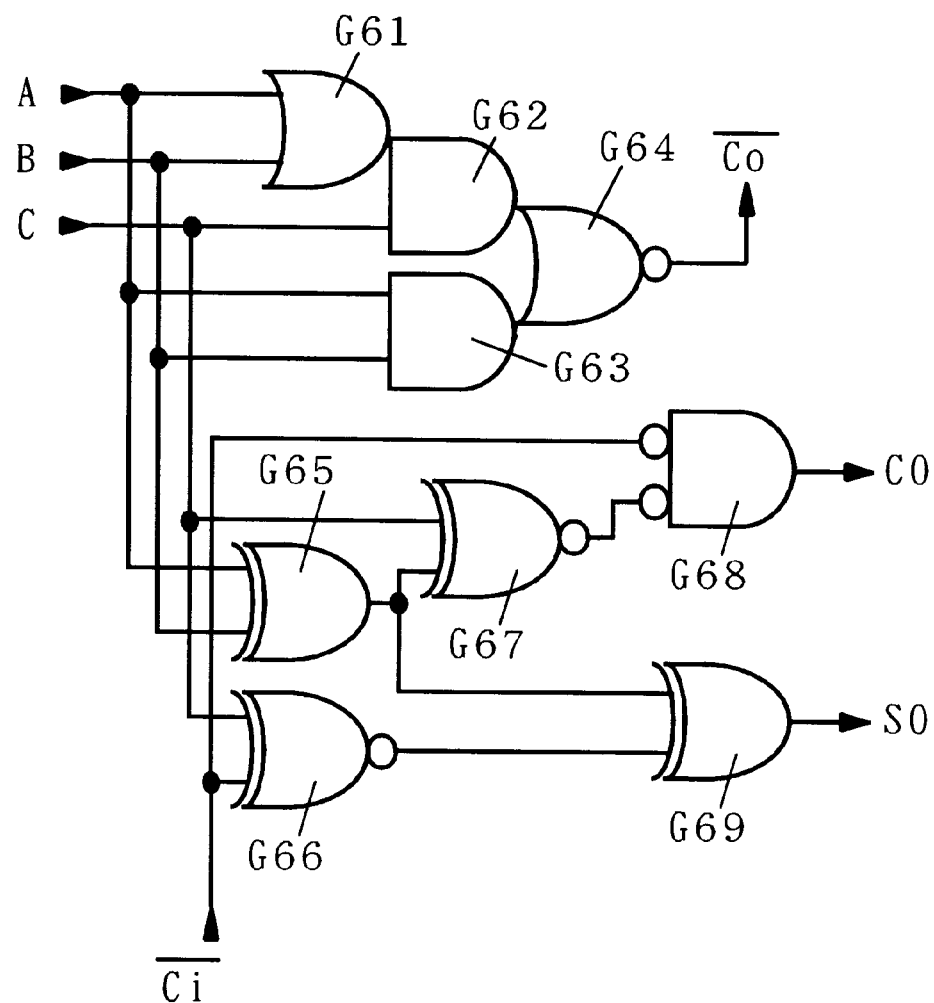
FIG. 12 is a circuit diagram illustrating a configuration of an extended 3-input 2-output adder 300.

FIG. 12 is a circuit diagram of an exemplary circuit satisfying the function of Table 10. To reduce the circuit scale and speed up the operation, logics of both the carry-in Ci and the carry-out Co are inverted.

An OR gate G61 receives the inputs A and B and an AND gate G62 receives an output from the OR gate G61 and the input C. An AND gate G63 receives the inputs A and B, and an NOR gate G64 receives outputs from the AND gates G62 and G63 and outputs an inversion of the carry-out Co. The gates G61 to G64 can be constructed as a compound gate.

An XOR gate G65 receives the inputs A and B and an XNOR gate G67 receives an output from the XOR gate G65 and the input C. A NOR gate G68 receives an output from the XNOR gate G67 and the inversion of the carry-in Ci and outputs the upper output CO.

An XNOR gate G66 receives the input C and the inversion of the carry-in Ci. An XOR gate G69 receives an output from the XNOR gate G66 and an output from the XOR gate G65 and outputs the lower output SO.

The critical path of the extended 3-input 2-output adder 300 goes from the inputs A, B and C of the lower-next bit to the upper output CO on its bit position and the delay time is between two stages of XORs and three stages of XORs.

The addition is performed in the order of the first stage of the tree circuit of FIG. 10 (the extended 3-input 2-output addition block 13a, the 3-input 2-output addition blocks 14a to 14c), the second stage (the 4-input 2-output addition blocks 12a and 12b) and the third stage (the 4-input 2-output addition block 12c). Accordingly, the delay time from the determination of the first elements $pp_0$ to $pp_{11}$ and the second elements $pc_0$ to $pc_{11}$ of the partial product to the determination of the lower output $so_{17}$ and the upper output $co_{17}$ of the 4-input 2-output addition block 12c as the two eventual intermediate sums is $(2+\alpha)+2\times 3=8+\alpha$ stages of XORs ($0<\alpha<1$) since the critical path goes through one stage of extended 3-input 2-output addition block and two stage of 4-input 2-output addition blocks. Thus, the delay time is between eight stages of XORs and nine stages of XORs and higher-speed operation is achieved as compared with the background art.

In the third preferred embodiment, like the first preferred embodiment, the minimum circuit scale is achieved when the highest one of the second elements $pc_j$ generated according to the secondary Booth algorithm and one of the first elements $pp_j$ of which the most significant bit is the lowest are inputted to the same 3-input 2-output adder.

Supplemental Description

In the first to third preferred embodiments, the present invention has been discussed, taking the 32×32 multiplier and the 24×24 multiplier using the secondary Booth algorithm as specific examples. Further, a general aspect of the present invention will be discussed.

Among two inputs of the multiplier, one to be encoded according to the secondary Booth algorithm is assumed a multiplier and the other is assumed a multiplicand. If the multiplier has 2n-bit or (2n−1)-bit width (n is integer equal to or more than two), n partial products are generated. Assuming that each partial product is $P_j$ (j=0 to n−1), when the first element $pp_j$ of (the bit width of the multiplicand+ 1)-bit width and the second element $pc_j$ of 1-bit width which is added to the least significant digit of the partial product if the partial product is negative are introduced, Formula 3 is true.

Figure 13:
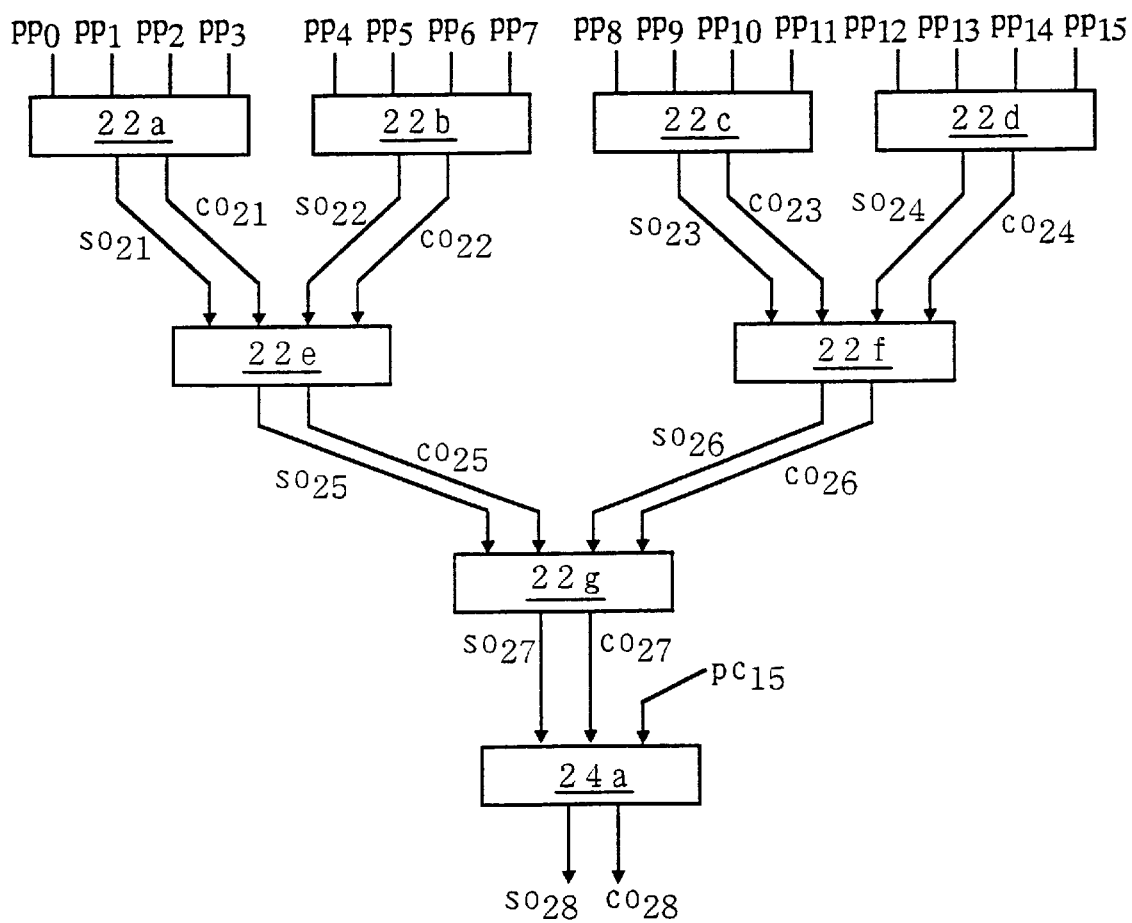
FIG. 13 is a block diagram of a configuration of a tree circuit in the background art.
Figure 14:
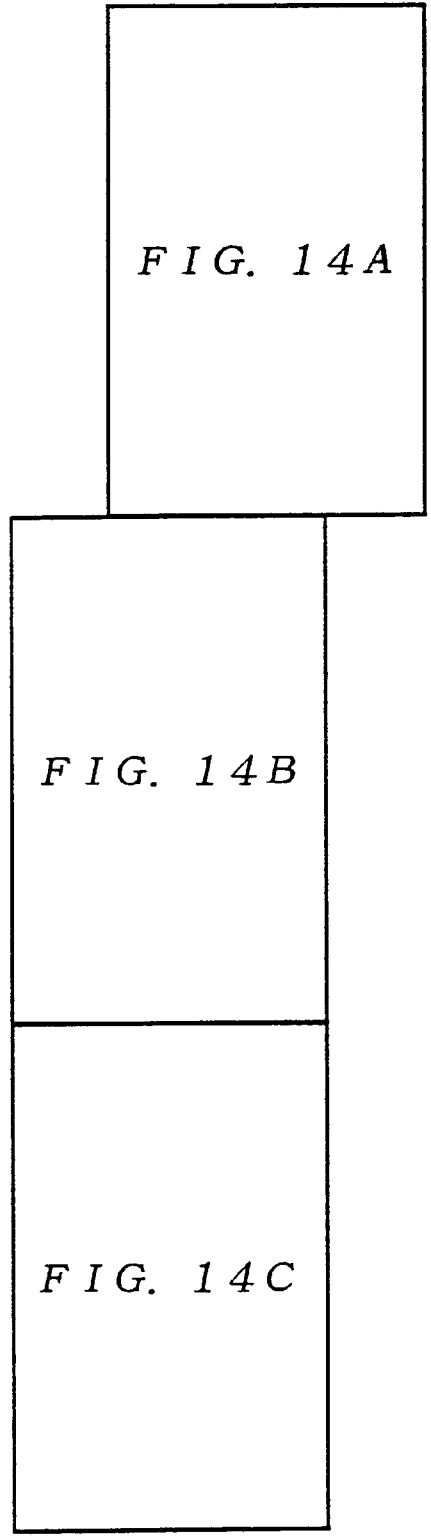
FIG. 14 is a schematic diagram showing the connection between FIGS. 14A to 14C.
Figure 14A:
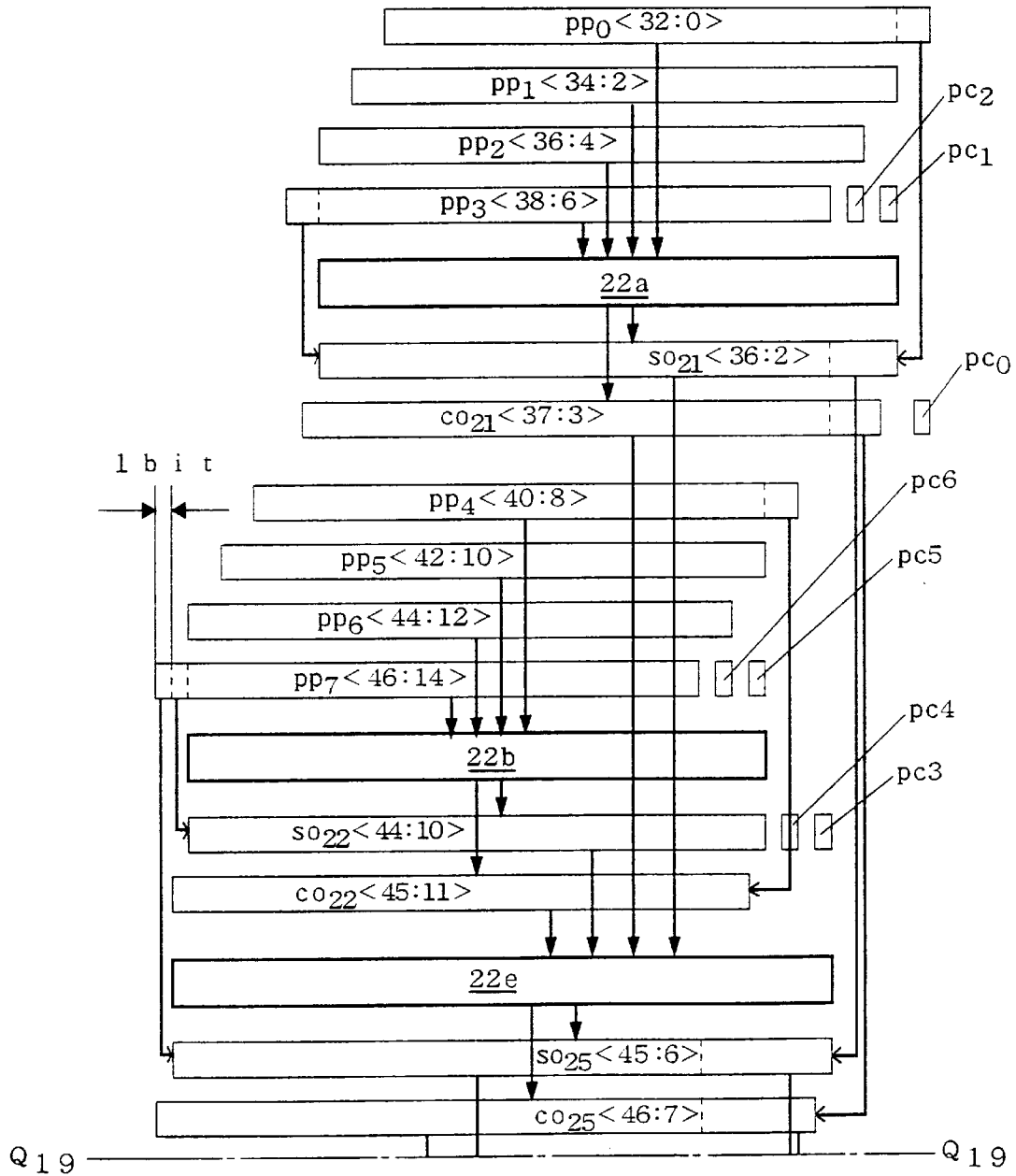
FIGS. 14A to 14C are block diagrams cooperatively showing the detail of FIG. 13.
Figure 14B:
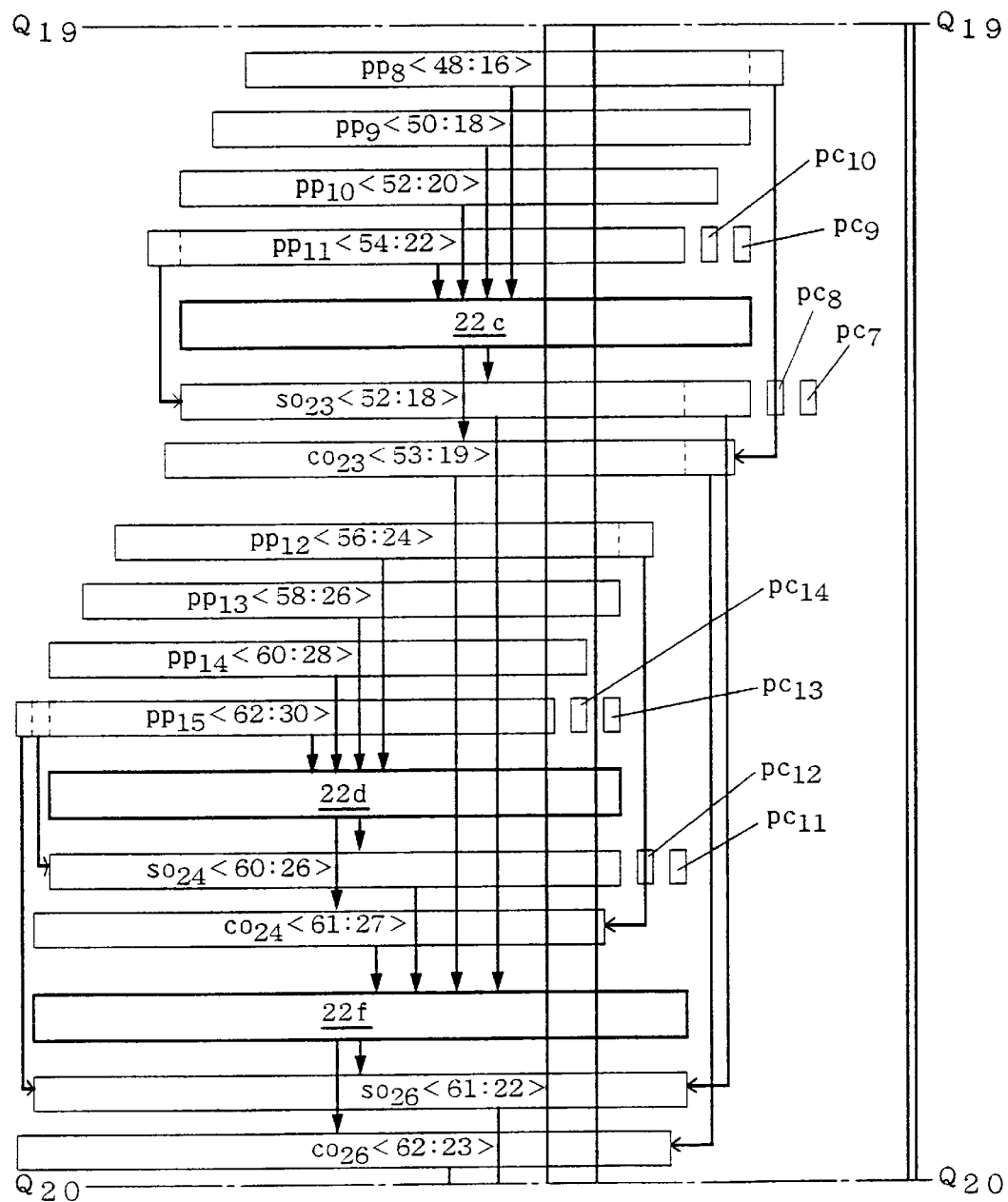
Figure 14C:
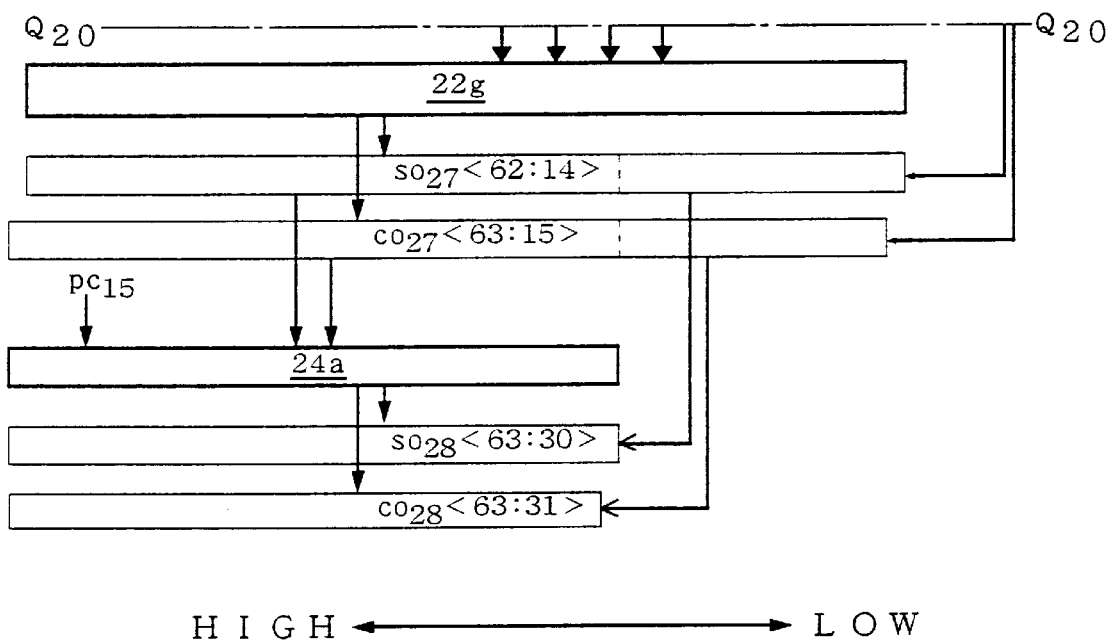
Figure 15A:
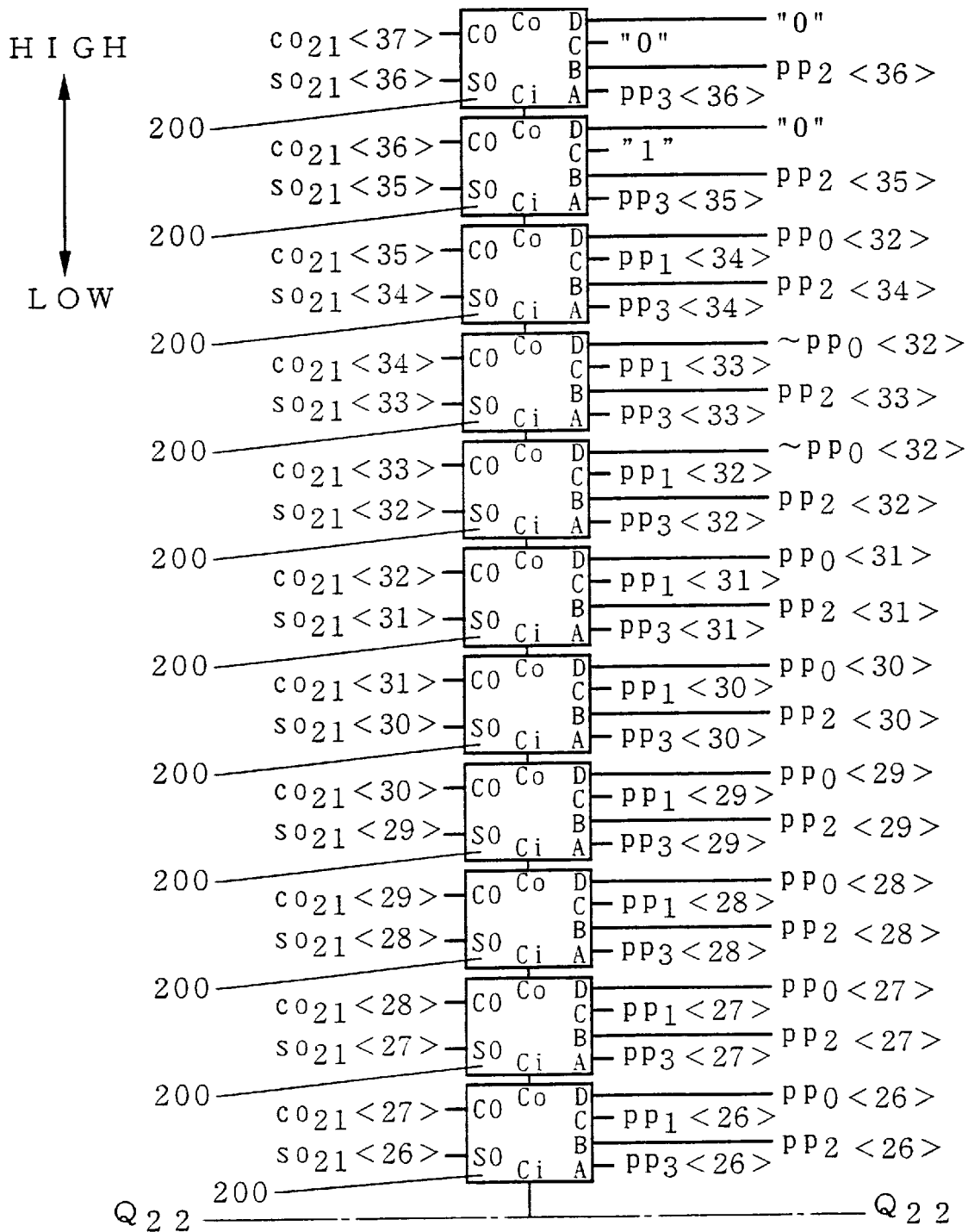
Figure 15B:
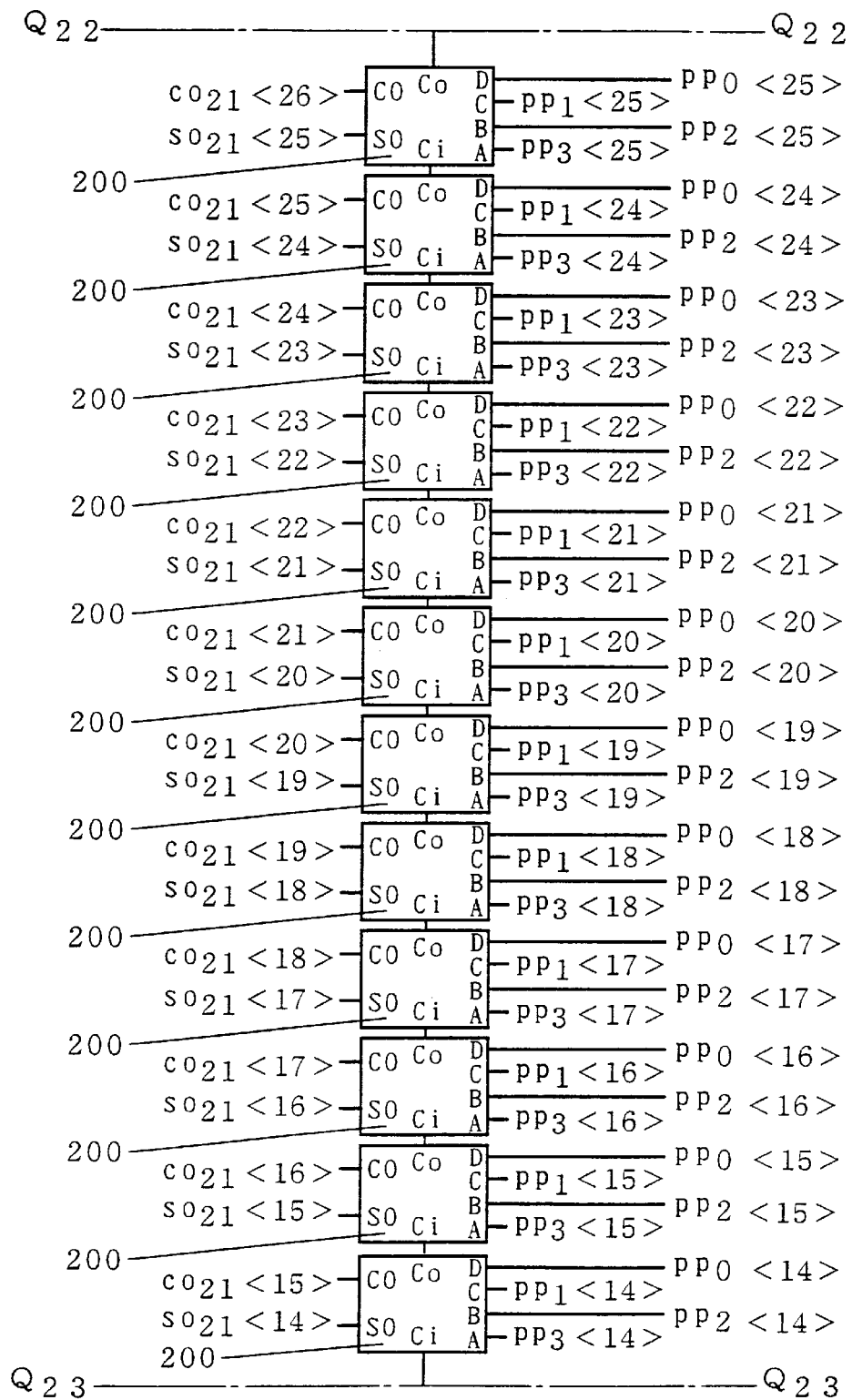
Figure 15C:
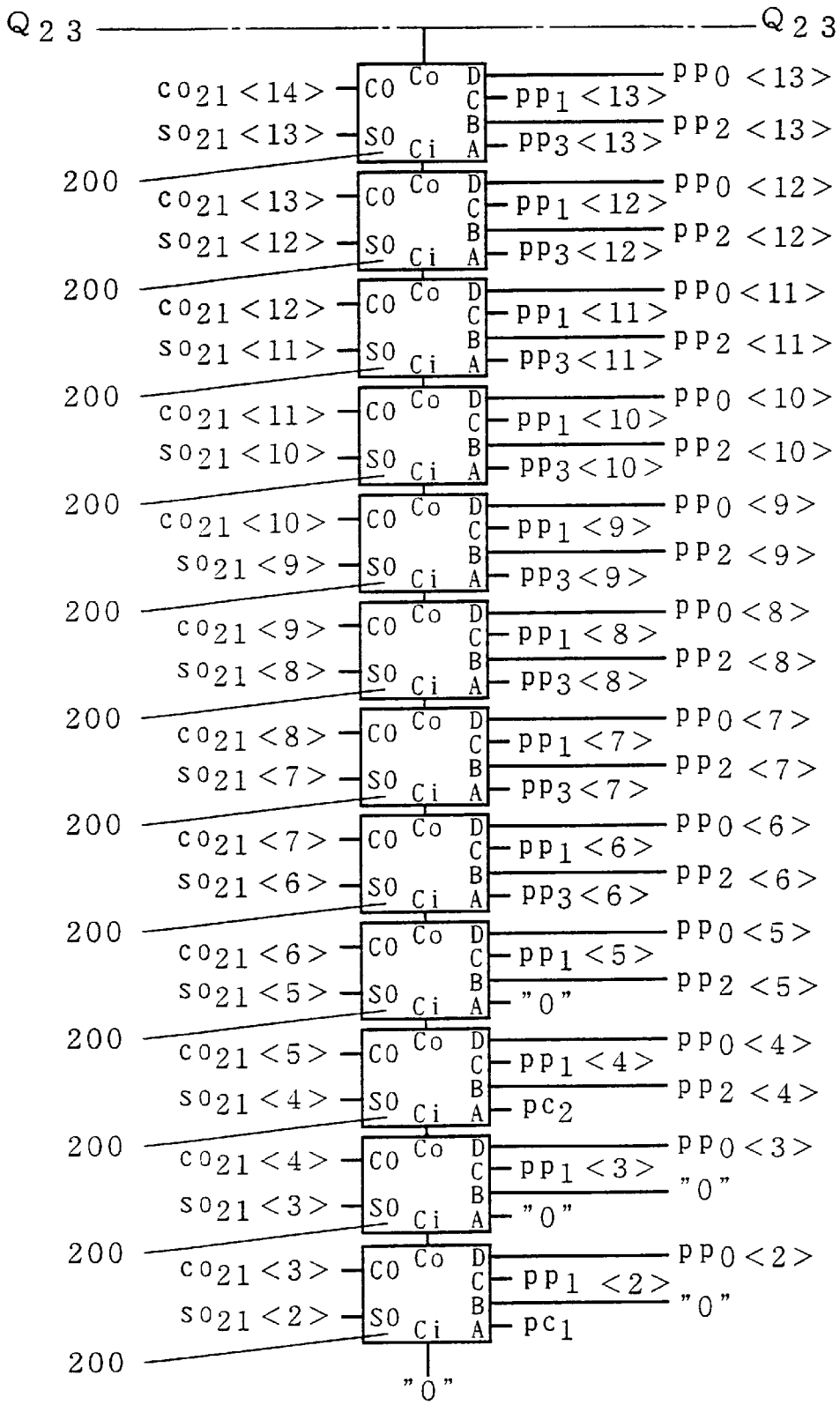
Figure 16:
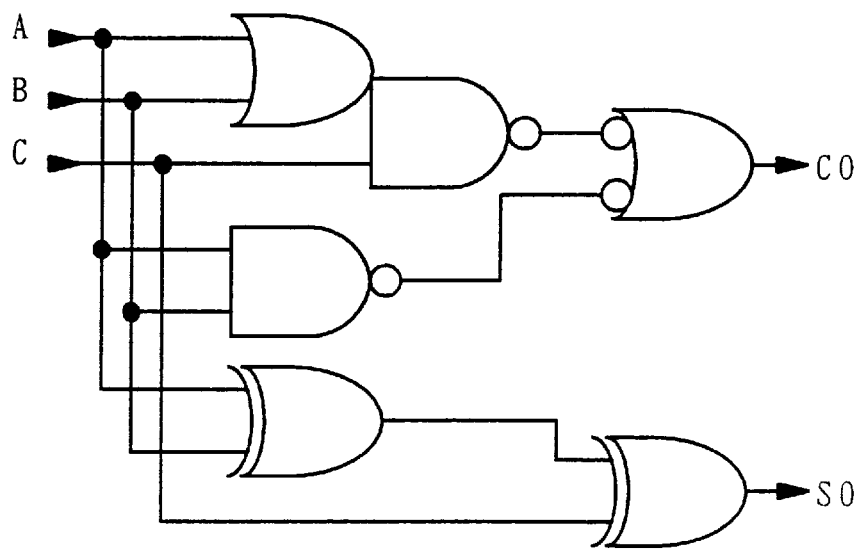
FIG. 16 is a circuit diagram of an exemplary configuration of a 3-input 2-output adder 400.
Figure 17:
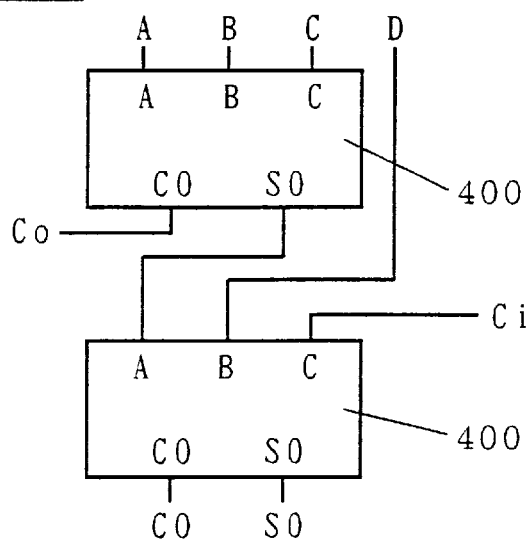
FIG. 17 is a block diagram of an exemplary configuration of a 4-input 2-output adder 200.
Figure 19:
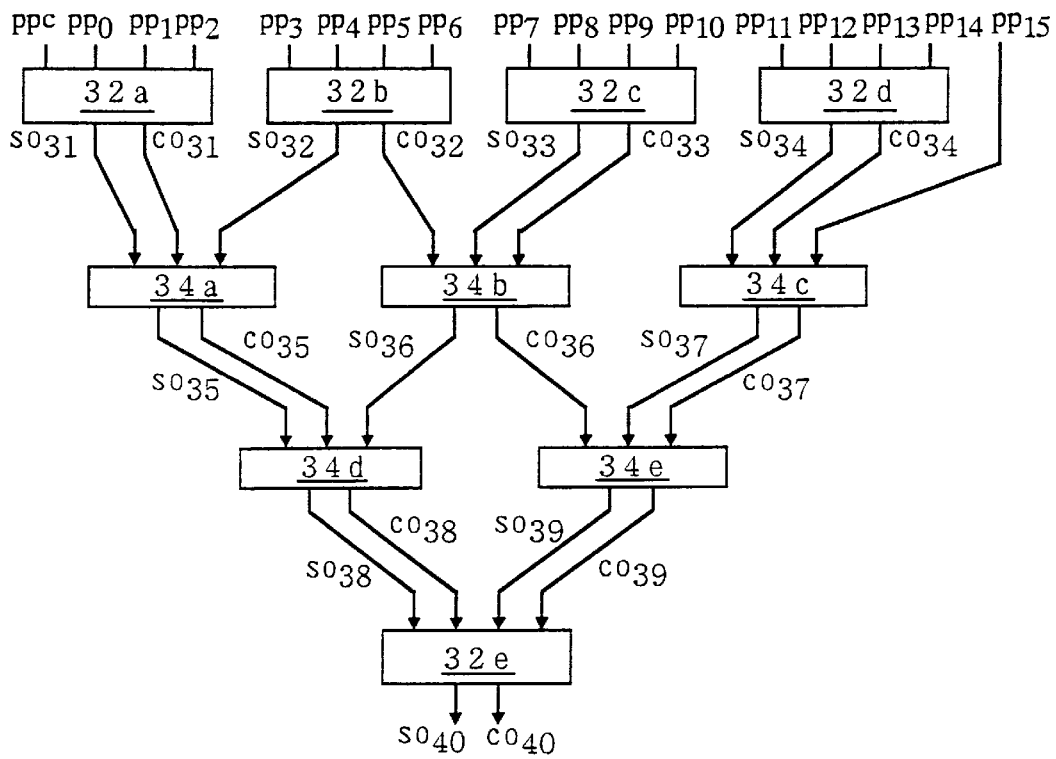
FIG. 19 is a block diagram of a configuration of the tree circuit in the background art.
Figure 20:
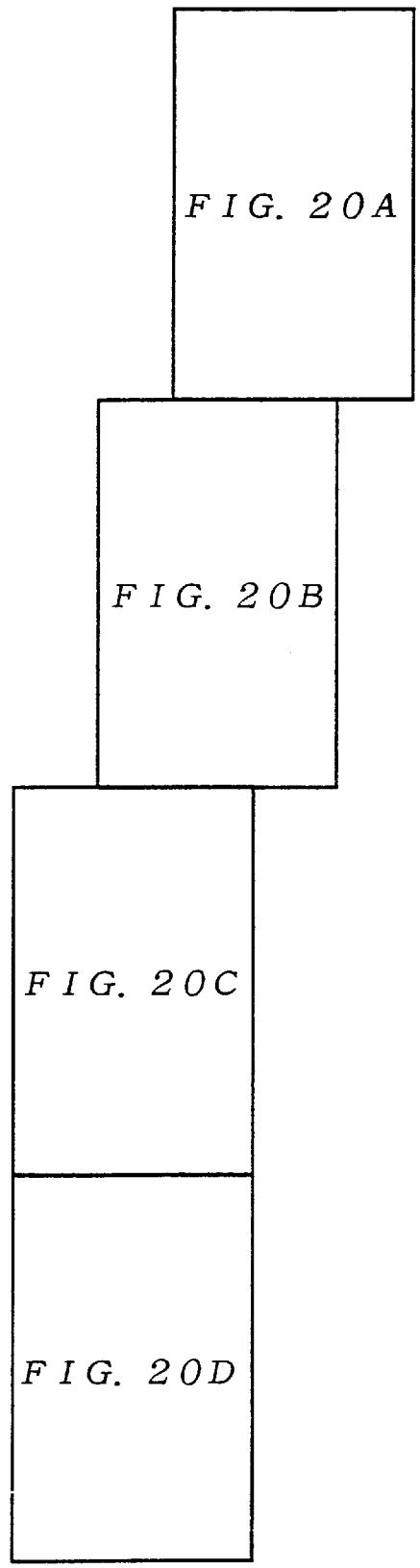
FIG. 20 is a schematic drawing showing the connection between FIGS. 20A to 20D.
Figure 20A:
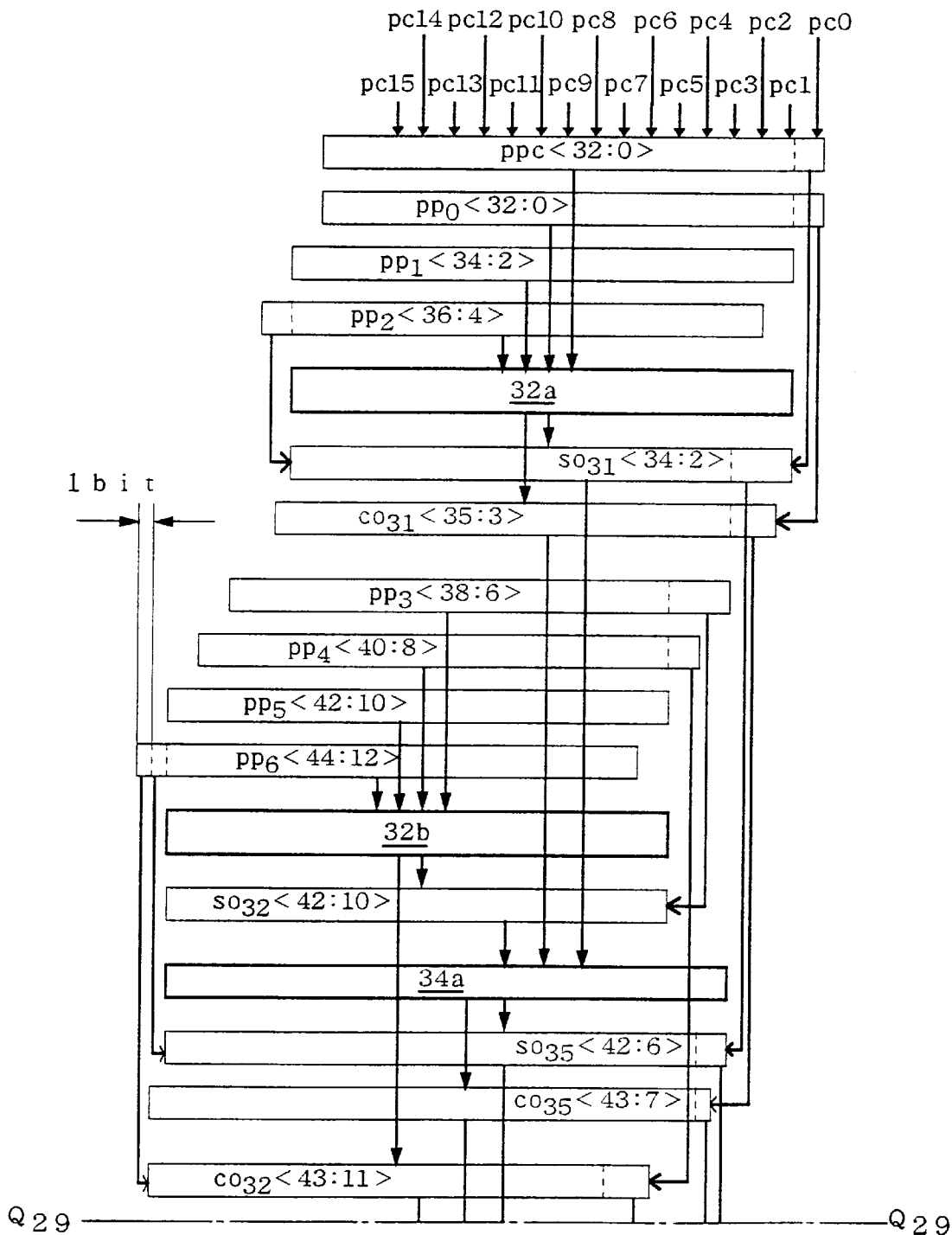
FIGS. 20A to 20D are block diagrams cooperatively showing the detail of FIG. 19.
Figure 20B:
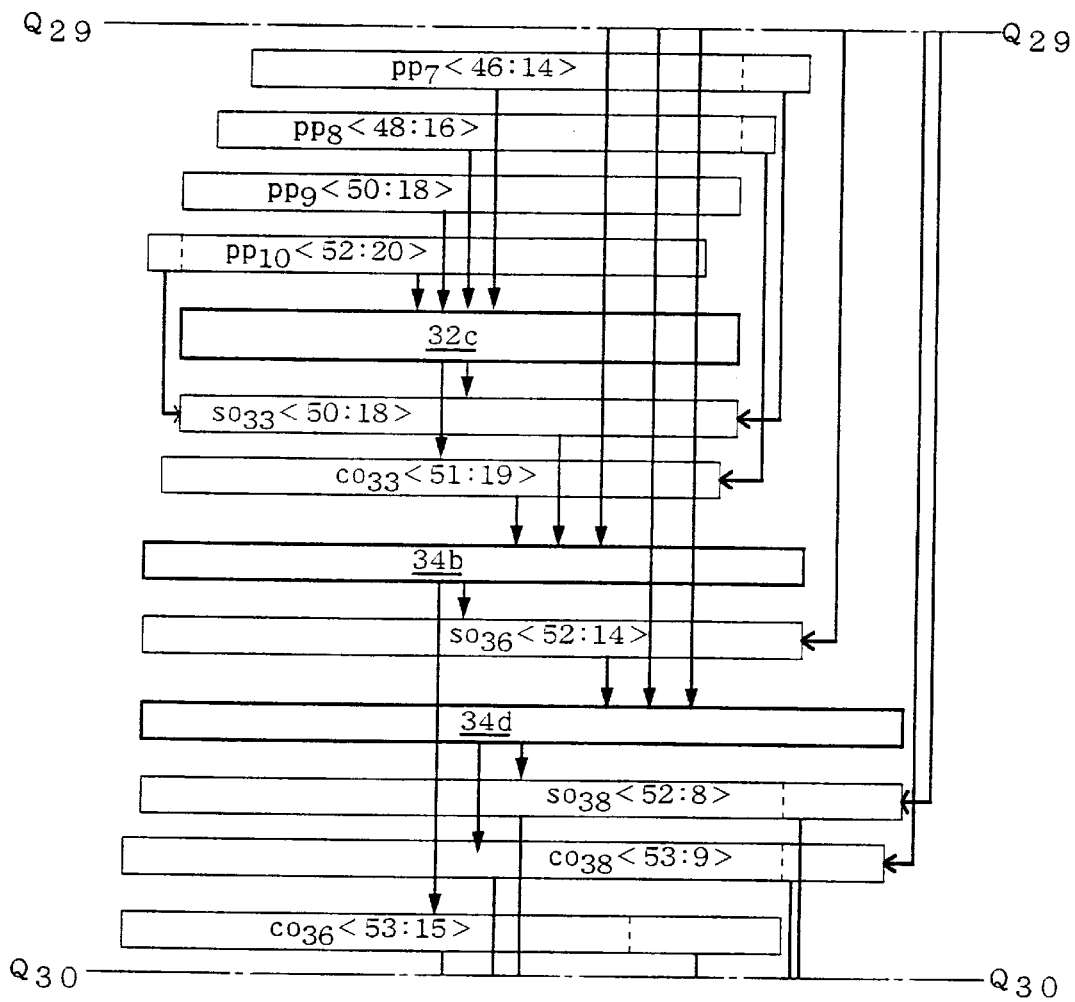
Figure 20C:
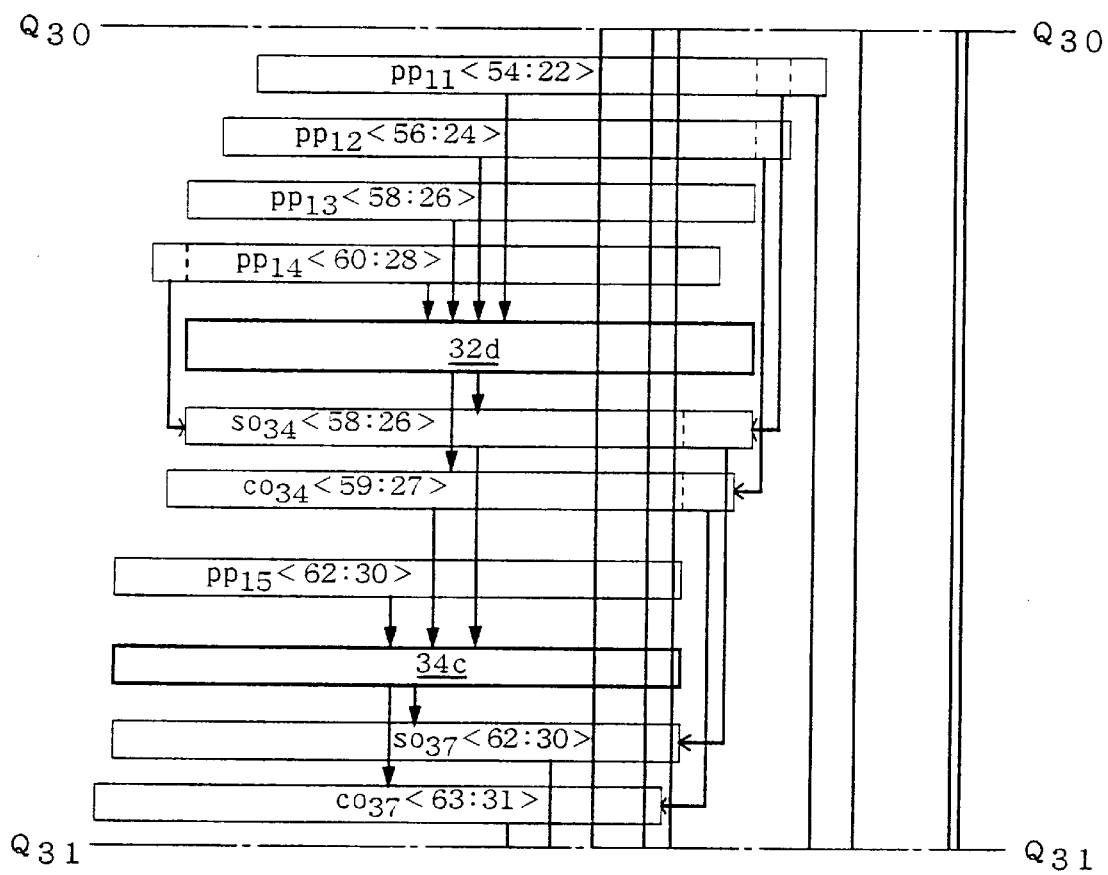
Figure 20D:
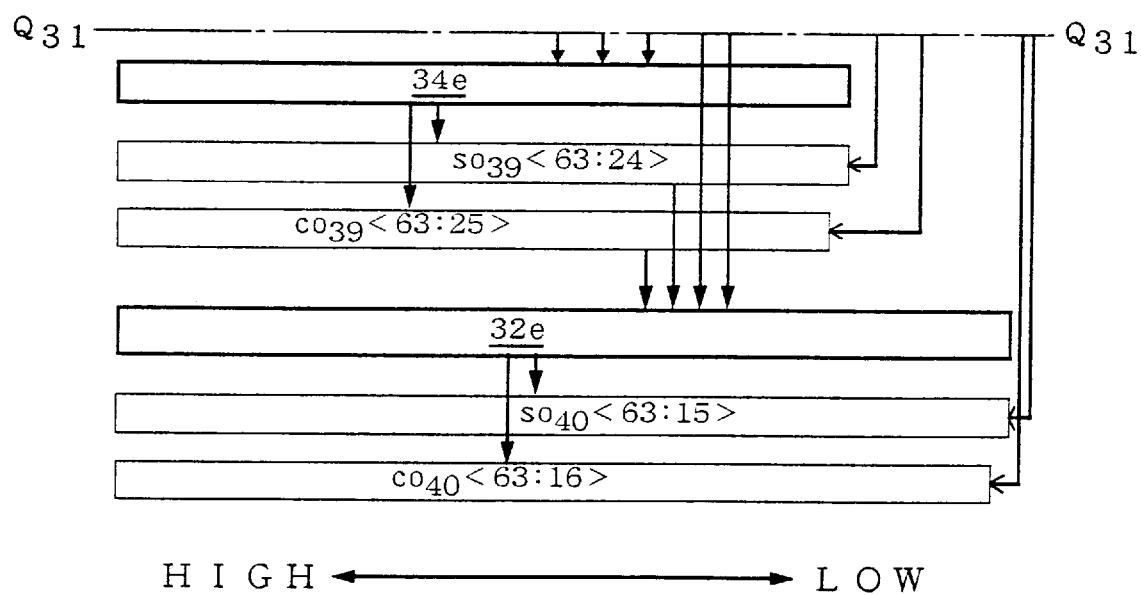
Figure 21:
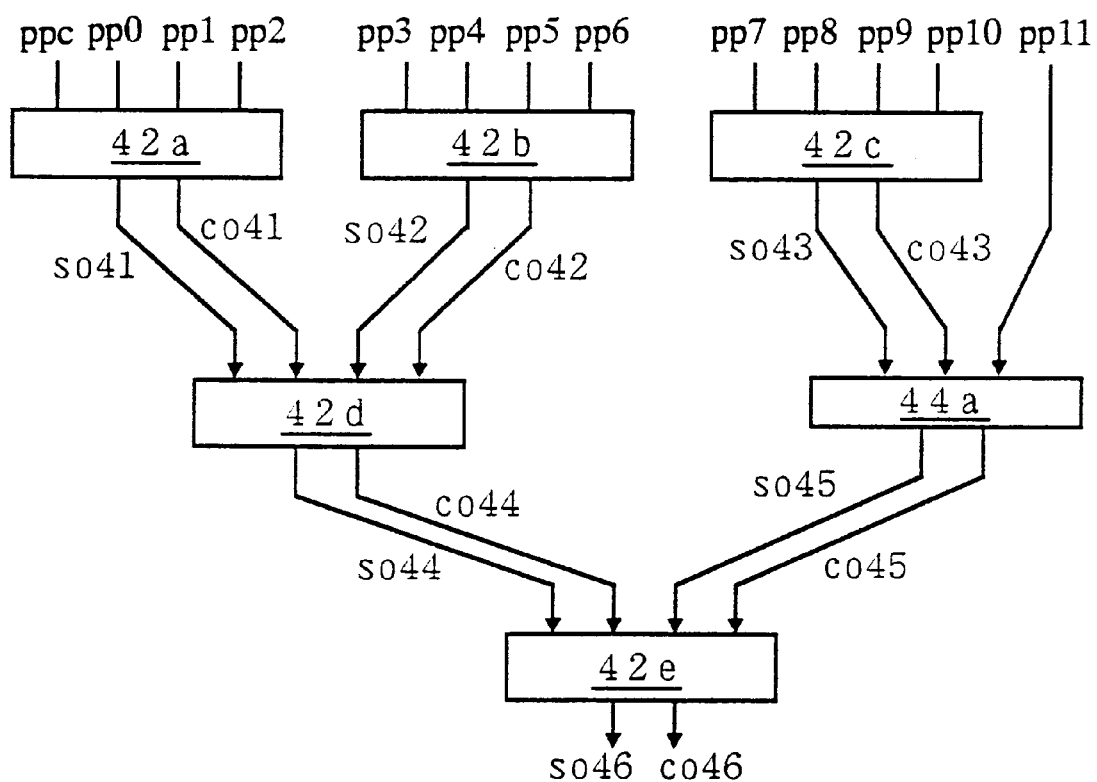
FIG. 21 is a block diagram illustrating the tree circuit in the background art.

As discussed in the background art, when a tree circuit is formed using the regular 4-input 2-output addition blocks and the regular 3-input 2-output addition blocks for adding up n partial products to output two intermediate sums, the (n−1) second elements $pc_j$ (j=0 to n−2) may be inputted to available terminals of the addition blocks, but the second element $pc_{(n-1)}$ has no available terminal to receive it. For this reason, the second element $pc_{(n-1)}$ is added separately (for example, shown in FIG. 13) or all of the second elements $pc_j$ (j=0 to n−1) are added up together (for example, shown in FIG. 19). Thus, the number of input data of the tree circuit is regarded as (n+1).

Only when the number of input data of the tree circuit consisting of the 4-input 2-output addition blocks and the 3-input 2-output addition blocks is $2^k \cdot 3^h$ (k=0, 1, 2, ..., h=0, 1, 2, ...), a "dense" tree circuit can be constructed ("dense" refers to a condition where the input data of the addition blocks in the same stage arrive at the same time to achieve ultimate parallel operation of the circuit). The reason is as follows.

Since the addition blocks constituting the tree circuit each have two outputs, the final stage of the "dense" tree circuit is necessarily a 4-input 2-output addition block. In the previous stage, either two 4-input 2-output addition blocks or two 3-input 2-output addition blocks are provided. In other words, the number of inputs of the addition blocks previous to the final addition block is eight or six. Tracing back from the final addition stage, it is found that the number of inputs of the "dense" tree circuit is $2^k 3^h$.

If the number of partial products n is $2^k 3^h$, the number of input data (n+1) is not $2^k 3^h$ and therefore it is impossible to form the "dense" tree circuit in the background art.

According to the present invention, one extended 4-input 2-output addition block or one extended 3-input 2-output addition block is used and apparently one more available terminal is provided as compared with the regular 4-input 2-output addition block or regular 3-input 2-output addition block. Therefore, the input data of the addition blocks in the same stage can arrive at the same time. Thus, the "dense" tree circuit can be formed, thereby reducing the delay time.

If the number of partial products n is not $2^k 3^h$, the "dense" tree circuit can not be formed because of intrinsic property of the number of partial products n and it is impossible to reduce the delay time even if the tree circuit having (n+1) inputs is formed according to the present invention.

Thus, if the multiplier (the input to be encoded according to the secondary Booth algorithm) has $2 \cdot 2^k \cdot 3^h$-bit or $(2 \cdot 2^k \cdot 3^h - 1)$-bit width, when the tree circuit for adding up a plurality of partial products in the multiplier according to the secondary Booth algorithm to output the two eventual intermediate sums are formed using the extended 4-input 2-output addition block or the extended 3-input 2-output addition block of the present invention, the input data of the addition blocks in the same stage of the tree circuit arrive at the same time, the number of logical stages in the critical path of the tree circuit is reduced, the parallel operation of the circuit is improved and higher operation of the multiplier is achieved.

When the highest one of the second elements $pc_j$ and the first element $pp_j$ of which the most significant bit is the lowest are inputted to the same extended 4-2 addition block or the same extended 3-input 2-output addition block, best area-efficiency is achieved.

While the invention has been shown and described in detail, the foregoing description is in all aspects illustrative and not restrictive. It is therefore understood that numerous modifications and variations can be devised without departing from the scope of the invention.

I claim:

1. A tree circuit, which performs a tournament addition on the basis of a plurality of partial products generated according to Booth algorithm, generating intermediate sums to be compressed, to output a pair of eventual intermediate sums, comprising:

regular addition blocks for adding a plurality of plural-number-bit data to output a pair of said intermediate sums; and an extended addition block for adding a plurality of plural-number-bit data and one-bit data to output a pair of said intermediate sums.

2. The tree circuit of claim 1, wherein each of said plurality of partial products is expressed as a product obtained by multiplying a sum of a first element of a plurality of bits and a second element of one bit by a scale, and said extended addition block receives said plurality of partial products and further receives said second element which belongs to one of said plurality of partial products other than those to be inputted thereto.

3. The tree circuit of claim 2, wherein said second element inputted to said extended addition block belongs to the partial product which has the largest scale among said plurality of partial products.

4. The tree circuit of claim 3, wherein the partial product which has the smallest scale among said plurality of partial products is inputted to said extended addition block.

5. The tree circuit of claim 4, wherein said extended addition block has extended adders, the number of which is a predetermined number, located on a specific bit position which is the bit position of said second element inputted therein and higher; and regular adders located lower than said specific bit position, and said extended adders each have one more upward-propagation outputs for outputting data to the higher-next bit as compared with said regular adders which constitute said regular addition block.

6. The tree circuit of claim 5, wherein said extended addition block further has an adder higher than said extended adders, and said adder located higher next to the highest one of said extended adders receives one of said upward-propagation outputs as an input other than a carry-in.

7. The tree circuit of claim 5, wherein said extended adders each have three inputs other than said upward-propagation outputs given from the lower-next bit position.

8. The tree circuit of claim 5, wherein said extended adders each have four inputs other than said upward-propagation outputs given from the lower-next bit position and one of said upward-propagation outputs takes either of different values depending on whether all of said four inputs have "1"s or not.

9. The tree circuit of claim 8, wherein said upward-propagation outputs are carry-outs.

10. The tree circuit of claim 8, wherein said upward-propagation outputs propagating between a plurality of said extended adders are generated as a pair of pseudo carry-outs and can be expressed as results of two predetermined arithmetic operations performed for a pair of carry-outs generated in said regular adders, and said carry-outs are commutative in both said two predetermined arithmetic operations.

11. The tree circuit of claim 10, wherein said pseudo carry-outs are a logic sum of said pair of carry-outs and an inversion of a logic product of said pair of carry-outs.

12. The tree circuit of claim 10, wherein the extended adder located on said specific bit position receives a carry-out from the lower-next bit position and said second element inputted to said extended addition block and propagates said pseudo carry-outs to the extended adder located on the higher-next bit position.

13. The tree circuit of claim 12, wherein said extended addition block further has a regular adder higher than said extended adders, and the highest one of said extended adders receives said pair of pseudo carry-outs from the lower-next bit position and outputs a pair of carry-outs to said regular adder located on the higher-next bit position.

* * * * *